(12) United States Patent
Yamamoto et al.

(10) Patent No.: US 6,765,732 B2
(45) Date of Patent: Jul. 20, 2004

(54) OPTICAL PICKUP LENS, MOLDED OPTICAL COMPONENT, HANDLING METHOD, AND MOLD FOR OPTICAL COMPONENT

(75) Inventors: Shogo Yamamoto, Hachioji (JP); Hiroyuki Hattori, Hachioji (JP); Etsuzo Kurihara, Hachioji (JP); Shinichiro Saito, Hachioji (JP); Takashi Matsumaru, Hachioji (JP); Taichiro Saito, Hachioji (JP); Kazuo Ishida, Hachioji (JP); Yuichi Atarashi, Hachioji (JP); Norikazu Arai, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/206,187

(22) Filed: Jul. 29, 2002

(65) Prior Publication Data

US 2003/0026007 A1 Feb. 6, 2003

(30) Foreign Application Priority Data

Aug. 3, 2001 (JP) .......................................... 2001-236797
Sep. 14, 2001 (JP) .......................................... 2001-279636

(51) Int. Cl.$^7$ .............................. G02B 3/02; G02B 7/02
(52) U.S. Cl. ........................................ 359/811; 359/718
(58) Field of Search ................................. 359/718, 719, 359/811, 812

(56) References Cited

U.S. PATENT DOCUMENTS

| | | | | | |
|---|---|---|---|---|---|
| 6,055,111 | A | * | 4/2000 | Nomura et al. | 359/642 |
| 6,078,430 | A | * | 6/2000 | Fukuda et al. | 359/642 |
| 6,144,500 | A | * | 11/2000 | Iwaki et al. | 359/719 |
| 2003/0026007 | A1 | * | 2/2003 | Yamamoto et al. | 359/811 |

* cited by examiner

Primary Examiner—David N Spector
(74) Attorney, Agent, or Firm—Finnegan, Henderson, Farabow, Garrett & Dunner, L.L.P.

(57) ABSTRACT

An objective lens for use in an optical pickup apparatus for conducting recording and/or reproducing information for an optical information recording medium, has a lens section shaped in an approximate circle and including a flange section; and a connecting section integrally provided to the lens section. The objective lens satisfies the following conditional formulas:

$$0.5 \leq A \leq 2.0, \quad 0.3A \leq B \leq 1.7A$$

where A is a diameter of the lens section when the lens section is viewed from an direction of an optical axis, and B is a width of the connecting section when the connecting section is viewed from the direction of the optical axis.

25 Claims, 20 Drawing Sheets

OPTICAL PICKUP LENS, MOLDED OPTICAL COMPONENT, HANDLING METHOD, AND MOLD FOR OPTICAL COMPONENT

BACKGROUND OF THE INVENTION

The present invention relates to a pickup lens for an optical disk which is used for reading information from a storage medium, or recording, mainly by using a laser beam, and in particular, to a pickup lens for an extremely small optical disk.

There are various formats (specifications) for information recording media available on the market, and various technologies are employed and studied for the various formats.

In recent years, in particular, a broadband has become popular to create a broadband age, and there are circulating high-volume contents of images, animations and sounds. It is therefore necessary, even for general users, to stock high-volume data.

With respect to a recording medium for data stocking, original ones were those wherein audio cassette tapes were used, and FD (floppy disk) is still used even today. In recent years, Zip (high-volume floppy disk having the measure of capacity of 100 M–200 M), MO (photo-electro-magnetic disk having the measure of capacity of 640 M–2.3 G), CD (optical disk having the measure of capacity of 640–700 M) and DVD (optical disk having the measure of capacity of 4.7 G) are used, which shows that the measure of capacity has grown great.

Among the aforesaid recording media, those utilizing light have their own optical systems.

The optical disks mentioned above have started from the music CD, and therefore, it is always necessary for the DVD which is becoming a leading recording medium now to consider interchangeability with CD, and a size of the DVD is large, which makes it difficult to provide a small-sized equipment, resulting in a problem. To solve this problem, a small-sized medium in a size of 8 cm and a deformed medium having a size of a business card have made an appearance, but it is unavoidable that they have less capacity.

Further, the DVD has a problem that many standards concerning information recording are present and interchangeability between them is insufficient.

With respect to the photo-electro-magnetic disk, problems of interchangeability with standards for low volume and problems that a size of a medium restricts a size of equipment remain unchanged, although the measure of capacity has been made great.

For those problems, there has been proposed a standard concerning a small-sized recording medium which is quite novel.

However, when a medium is small in size, an optical pickup lens and a unit are required to be small in size.

When an optical pickup lens and a unit are made to be small in size, manufacturing, assembling and adjustment of the lens itself become extremely difficult.

SUMMARY OF THE INVENTION

An object of the invention, therefore, is to propose forms which make manufacturing, assembling and adjustment to be easy for an optical pickup lens and an optical pickup unit which are extremely small.

The above object can be attained by the following structures and methods in respective Item.

Item (1-1)

An objective lens used in an optical pickup device that conducts recording and/or reproduction of information for an optical information recording medium, wherein there are provided a lens section which includes a flange section and is almost in a circular form, and a connecting section used as a supporting section for the lens section, the connecting section is provided to be solid with the lens section, and each of them satisfies the following relations;

$0.5 \leq A \leq 2.0$ $0.3A \leq B \leq 1.7A$ where A represents a diameter (mm) of the lens section viewed in the optical axis direction, and B represents a width (mm) of the connecting section viewed in the optical axis direction.

Item (1-2)

The objective lens according to Item (1-1), wherein a connecting section is provided to be extended from the lens section.

Item (1-3)

The objective lens according to Item (1-2), wherein the objective lens is formed by filling resins through a single inlet in a metal mold.

Item (1-4)

The objective lens described in Item (1-2) or in Item (1-3), wherein the following expression is satisfied.

$0.3A \leq B \leq 0.8A$

Item (1-5)

The objective lens described in Items (1-2)–(1-4), wherein the connecting section is cut so that nothing may be protruded outside a shape which is roughly circular when viewed in the direction of an optical axis.

Item (1-6)

The objective lens according to Item (1-1), wherein two connecting sections are provided to be extended from the lens section in the direction to face each other.

Item (1-7)

The objective lens according to Item (1-6), wherein the two connecting sections are different from each other.

Item (1-8)

The objective lens according to Item (1-7), wherein the two connecting sections are different from each other in terms of thickness in the optical axis direction.

Item (1-9)

The objective lens according to Item (1-6)–Item (1-8), wherein the two connecting sections are different from each other in terms of thickness in the direction perpendicular to the optical axis.

Item (1-10)

The objective lens according to Item (1-6)–Item (1-9), wherein the two connecting sections are different from each other in terms of a length of the width viewed in the direction of the optical axis.

Item (1-11)

The objective lens according to Item (1-1), wherein a lens section is formed to be arranged at the center of a rectangular connecting section.

Item (1-12)

The objective lens according to Item (1-6)–Item (1-11), wherein the objective lens is formed by filling resins through a single or plural inlets in a metal mold.

Item (1-13)

The objective lens according to Item (1-6)–Item (1-10) or to Item (1-12), wherein two connecting sections are provided to be extended from the lens section in the direction to face each other, and are formed with resins filled through an edge portion of each connecting section.

Item (1-14)

The objective lens according to Item (1-11) or Item (1-12), wherein a lens section is formed to be arranged at the center of a rectangular connecting section, and resins are filled through an edge portion of the connecting section to be formed.

Item (1-15)

The objective lens according to Item (1-12)–Item (1-14), wherein a weld is located outside an optical functional surface of the lens section.

Item (1-16)

The objective lens according to Item (1-1)–Item (1-15), wherein the objective lens is an aspherical lens.

Item (1-17)

The objective lens according to Item (1-1)–Item (1-16), wherein the objective lens is a lens obtained through compression molding.

Item (1-18)

The objective lens according to Item (1-1)–Item (1-16), wherein the objective lens is a lens obtained through injection molding.

Item (1-19)

The objective lens according to Item (1-18), wherein the connecting section serves also as a resin inflow path for the lens section.

Item (1-20)

The objective lens according to Item (1-18)–Item (1-19), wherein the objective lens is a plastic lens.

Item (1-21)

The objective lens according to Item (1-17), wherein the objective lens is a glass lens.

Item (1-22)

The objective lens according to Item (1-1)–Item (1-21), wherein a diffractive Item is formed on the optical functional surface of the objective lens.

Item (1-23)

A manufacturing method for an optical element for forming by filling resins through a plurality of inlets in a metal mold, wherein the time to start injecting resins is staggered when filling resins through the plural inlets.

Inventions relating to a handling method among the present inventions are attained by the following Items.

Item (2-1)

An optical molded component having therein a supporting shaft section having a first cross-sectional area, a connecting section that is provided to be continued in the axial direction of the supporting shaft section and has a cross-sectional area smaller than the first cross-sectional area and an optical functional section provided to be continued from the connecting section, wherein the total weight of the supporting shaft section and the connecting section is greater than the weight of the optical functional section.

Item (2-2)

An optical molded component having therein a supporting shaft section having a first cross-sectional area, a connecting section that is provided to be continued in the axial direction of the supporting shaft section and has a cross-sectional area smaller than the first cross-sectional area and an optical functional section provided to be continued from the connecting section, wherein the total weight of the supporting shaft section and the connecting section is not less than 70% of the whole weight.

Item (2-3)

An optical molded component having therein a supporting shaft section having a first cross-sectional area, a connecting section that is provided to be continued in the axial direction of the supporting shaft section and has a cross-sectional area smaller than the first cross-sectional area and an optical functional section provided to be continued from the connecting section, wherein an information recording site is provided on the supporting shaft section.

Item (2-4)

An optical molded component having therein a supporting shaft section having a first cross-sectional area, a connecting section that is provided to be continued in the axial direction of the supporting shaft section and has a cross-sectional area smaller than the first cross-sectional area and an optical functional section provided to be continued from the connecting section, wherein an information recording site is provided on the connecting section.

Item (2-5)

The optical molded component described in Item (2-1)–Item (2-4), wherein a shape of a section of the supporting shaft section is almost circular.

Item (2-6)

The optical molded component described in Item (2-1)–Item (2-5), wherein a shape of a section of the supporting shaft section is almost trapezoid.

Item (2-7)

The optical molded component described in Item (2-1)–Item (2-6), wherein a shape of a section of the supporting shaft section is almost semicircular.

Item (2-8)

In the invention described in Item (2-8), it is characterized that a parallel flat portion that is almost in parallel with a chord section is formed on a part of an arc section of the supporting section in the optical molded component described in Item (2-7).

Item (2-9)

In the invention described in Item (2-9), it is characterized that a protruded portion that is protruded from the parallel flat portion stated above and is in a shape which is almost a truncated square pyramid is formed in the optical molded component described in Item (2-8).

Item (2-10)

In the invention described in Item (2-10), it is characterized that a side section of the protruded portion is composed of a pair of longitudinal sides which face each other in the longitudinal direction of the supporting section and a pair of lateral sides which face each other in the lateral direction, and an angle formed between the longitudinal side and the parallel flat section is made to be 45° or less, in the optical molded component described in Item (2-9).

Item (2-11)

The optical molded component described in Item (2-7) to Item (2-10), wherein a normal line on a chord section of the approximate semicircle almost agrees with an optical axis on an optical functional surface of the optical functional section.

Item (2-12)

The optical molded component described in Item (2-1)–Item (2-11), wherein a protruded portion is formed on the supporting shaft section.

Item (2-13)

In the invention described in Item (2-13), it is characterized that the protruded portion is formed to be almost in a truncated square pyramid, in the optical molded component described in Item (2-12).

Item (2-14)

In the invention described in Item (2-14), it is characterized that a corner section of the convex portion is chamfered, in the optical molded component described in Item (2-13).

Item (2-15)

The optical molded component described in Item (2-1)–Item (2-14), wherein a concave portion is formed on the supporting shaft section.

Item (2-16)

The optical molded component described in Item (2-1)–Item (2-15), wherein a stress-concentration portion is formed on the connecting section.

Item (2-17)

The optical molded component described in Item (2-16), wherein the stress-concentration portion is a V-shaped concave portion which is concave in the direction which is mostly perpendicular to the optical axis on the optical functional surface of the optical functional section.

Item (2-18)

The optical molded component described in Item (2-16), wherein the stress-concentration portion is a V-shaped concave portion which is concave in the direction which is mostly the same as the optical axis on the optical functional surface of the optical functional section.

Item (2-19)

In the invention described in Item (2-19), it is characterized that the connecting section has an index portion that is based on a distance from the center of an optical axis of the optical functional section, in the optical molded component described in either one of Items (2-1)–(2-18).

Item (2-20)

In the invention described in Item (2-20), it is characterized that the index portion is formed by cutting into the connecting section, in the optical molded component described in Item (2-19).

Item (2-21)

In the invention described in Item (2-21), it is characterized that the index portion is formed to be protruded from the connecting section, in the optical molded component described in Item (2-19).

Item (2-22)

In the invention described in Item (2-22), it is characterized that the index portion is formed to be a straight line extending in the lateral direction of the connecting section, in the optical molded component described in either one of Items (2-19)–(2-21).

Item (2-23)

In the invention described in Item (2-23), it is characterized that the index portion is formed to be a locus of a circle having a prescribed radius whose center is on the optical axis in the optical molded component described in either one of Items (2-19)–(2-21).

Item (2-24)

When handling the optical molded component described in Item (2-19 to (2-23), a method of handling an molded optical component is characterized in that an optical molded component is taken out of a metal mold for molding an optical molded component that is provided with a first resin inflow path having a first cross-sectional area, a second resin inflow path being located ahead of the first resin inflow path in the direction of resin flow and having a cross-sectional area smaller than the first cross-sectional area and an optical functional section molding section being located further ahead of the second resin inflow path in the direction of resin flow, and then, the optical molded component is handled on the basis of a site formed by the first resin inflow path.

Item (2-25)

When handling the optical molded component described in Item (2-19 to (2-23), a method of handling an molded optical component is characterized in that an optical molded component is taken out of a metal mold for molding an optical molded component that is provided with a first resin inflow path having a first cross-sectional area, a second resin inflow path being located ahead of the first resin inflow path in the direction of resin flow and having a cross-sectional area smaller than the first cross-sectional area and an optical functional section molding section being located further ahead of the second resin inflow path in the direction of resin flow, and then, the optical molded component is handled on the basis of a site which is formed by the first resin inflow path and is continued to a site formed by the second resin inflow path, after the site formed by the first resin inflow path is cut.

Item (2-26)

When handling the optical molded component described in Item (2-19 to (2-23), a method of handling an molded optical component is characterized in that an optical molded component is taken out of a metal mold for molding an optical molded component that is provided with a first resin inflow path having a first cross-sectional area, a second resin inflow path being located ahead of the first resin inflow path in the direction of resin flow and having a cross-sectional area smaller than the first cross-sectional area and an optical functional section molding section being located further ahead of the second resin inflow path in the direction of resin flow, and then, the optical molded component is handled on the basis of a site which is formed by the first resin inflow path and is continued to a site formed by the second resin inflow path, after the prescribed site formed by the first resin inflow path is cut.

Item (2-27)

The method of handling an optical molded component described in Item (2-26), wherein the aforementioned prescribed site is a site formed by the first resin inflow path mentioned above that is away, by a distance determined in advance, from a boundary between the site formed by the first resin inflow path and the site formed by the second resin inflow path.

Item (2-28)

The method of handling an optical molded component described in Item (2-24)–Item (2-27), wherein "handling" means positioning of the optical molded component.

Item (2-29)

The method of handling an optical molded component described in Item (2-24)–Item (2-28), wherein "handling" means holding of the optical molded component.

Item (2-30)

The method of handling an optical molded component described in Item (2-24)–Item (2-29), wherein "handling" means mounting of the optical molded component.

Item (2-31)

The method of handling an optical molded component described in Item (2-24)–Item (2-30), wherein "handling" means cutting of the optical molded component.

Item (2-32)

The method of handling an optical molded component described in Item (2-24)–Item (2-31), wherein "handling" means cutting of the site formed by the second resin inflow path after combining the optical functional section of the optical molded component with another member.

Item (2-33)

The method of handling an optical molded component described in Item (2-32), wherein another member stated above is a cartridge for conveyance.

Item (2-34)

The method of handling an optical molded component described in Item (2-32), wherein another member stated above is a pickup unit.

Item (2-35)

The method of handling an optical molded component described in Item (2-24)–Item (2-34), wherein "handling" means recording information on the site formed by the first resin inflow path.

Item (2-36)

In the invention described in Item (2-36), it is characterized that the "handling" is to record information on a portion formed by the second resin inflow path in the optical molded component, in the method of handling an optical molded component described in either one of Item (2-24)–(2-34).

Item (2-37)

The method of handling an optical molded component described in Item (2-35) or (2-36), wherein the information means a number of a metal mold.

Item (2-38)

The method of handling an optical molded component described in Item (2-35)–Item (2-37), wherein the information means a cavity number.

Item (2-39)

The method of handling an optical molded component described in Item (2-35)–Item (2-38), wherein the recording of information is conducted by marking.

Item (2-40)

The method of handling an optical molded component described in Item (2-35)–Item (2-39), wherein the recording of information is conducted by printing.

Item (2-41)

The method of handling an optical molded component described in Item (2-35)–Item (2-40), wherein the recording of information is conducted by pasting.

The invention of the handling method relating to the molded component among the present inventions can be attained by the following means.

Item (2-42)

The method of handling an optical molded component described in Item (2-12)–Item (2-15), wherein the protruded portion and/or the concave portion is used as an index for positioning.

Item (2-43)

The method of handling an optical molded component described in Item (2-12)–Item (2-15), wherein the protruded portion and/or the concave portion is used as a guide in the course of handling.

Item (2-44)

A metal mold for molding an optical molded component described in any one of Items (2-1) to (2-23), having therein a first resin inflow path having a first cross-sectional area, a second resin inflow path being located ahead of the first resin inflow path in the direction of resin flow and having a cross-sectional area smaller than the first cross-sectional area and an optical functional section molding section being located further ahead of the second resin inflow path in the direction of resin flow, wherein there is formed an optical molded component having therein a supporting shaft section formed by the first resin inflow path, a connecting section formed by the second resin inflow path and an optical functional section formed by the optical functional section molding section.

Item (2-45)

The metal mold for molding an optical molded component described in Item (2-44), wherein a part of the first resin inflow path is formed so that a three-dimensional distinguishing mark may be formed.

Item (2-46)

The metal mold for molding an optical molded component described in Item (2-44)–Item (2-45), wherein the direction of resin flow for each of the first resin inflow path and the second resin inflow path is almost linear.

Item (2-47)

The metal mold for molding an optical molded component described in Item (2-44)–Item (2-46), wherein the direction of resin flow for the first resin inflow path and that for the second resin inflow path are in accord with each other, and are mostly linear.

Item (2-48)

The metal mold for molding an optical molded component described in Item (2-44)–Item (2-47), wherein the direction of resin flow for the first resin inflow path and that for the second resin inflow path are in the relationship to cross mostly at right angles.

Item (2-49)

The metal mold for molding an optical molded component described in Item (2-44)–Item (2-48), wherein the first resin inflow path is a runner.

Item (2-50)

The metal mold for molding an optical molded component described in Item (2-44)–Item (2-49), wherein the second resin inflow path is a gate.

Item (2-51)

The metal mold for molding an optical molded component described in Item (2-44)–Item (2-50), wherein the first resin inflow path is formed so that a shape of a section of the supporting shaft section may be almost circular.

Item (2-52)

The metal mold for molding an optical molded component described in Item (2-44)–Item (2-50), wherein the first resin inflow path is formed so that a shape of a section of the supporting shaft section may be almost trapezoid.

Item (2-53)

The metal mold for molding an optical molded component described in Item (2-44)–Item (2-50), wherein the first resin inflow path is formed so that a shape of a section of the supporting shaft section may be almost semicircular.

Item (2-54)

The metal mold for molding an optical molded component described in Item (2-53), wherein the first resin inflow path and the optical functional section molding section are formed so that a normal line on a chord section of the approximate semicircle may almost agree with an optical axis on an optical functional surface of the optical functional section.

Item (2-55)

The metal mold for molding an optical molded component described in Item (2-44)–Item (2-54), wherein the first resin inflow path is formed so that a protruded portion may be formed on the supporting shaft section.

Item (2-56)

The metal mold for molding an optical molded component described in Item (2-44)–Item (2-55), wherein the first resin inflow path is formed so that a concave portion may be formed on the supporting shaft section.

Item (2-57)

The metal mold for molding an optical molded component described in Item (2-44)–Item (2-56), wherein the second resin inflow path is formed so that a stress-concentration portion may be formed on the connecting section.

The invention relating to the method of molding employing a metal mold among the present inventions can be attained by the following means.

Item (2-58)

An optical molded component that is molded by the metal mold for molding an optical molded component in the aforesaid Items (2-44)–(2-57), and has a supporting shaft section formed by the first resin inflow path, a connecting section formed by the second resin inflow path and the optical functional section formed by the optical functional section molding section.

The invention relating to the method of molding employing a metal mold among the present inventions can be attained by the following means.

Item (2-59)

A method of molding an optical molding component that molds an optical molded component by the use of the metal mold for molding an optical molded component in the aforesaid Items (2-44)–(2-57).

Item (2-60)

In the invention described in Item (2-60), it is characterized that the optical molded component described in either one of Items (2-1)–(2-23) is provided in the optical pickup unit.

The invention relating to a method of assembling an optical pickup unit among the present inventions can be attained by the following means.

Item (2-61)

An optical pickup unit assembling method for the optical pickup unit described in Item (2-60) wherein a molded component in which an optical functional section and a supporting shaft section that is greater than the optical functional section are formed integrally through a connecting section is incorporated with an optical pickup unit through the optical functional section while holding the supporting shaft section, and then, the connecting section is cut.

Item (2-62)

An optical pickup unit assembling method for the optical pickup unit described in Item (2-60) wherein a molded component in which an optical functional section and a supporting shaft section that is greater than the optical functional section are formed integrally through a connecting section is incorporated with a housing container through the optical functional section while holding the supporting shaft section, and then, the connecting section is cut.

Item (2-63)

The optical pickup unit assembling method described in Item (2-61)–Item (2-62), wherein the supporting shaft portion is greater than the optical functional section in terms of volume.

Item (2-64)

The optical pickup unit assembling method described in Item (2-61)–Item (2-63), wherein the supporting shaft portion is greater than the optical functional section in terms of weight.

DETAILED DESCRIPTION OF THE PREFERRED EMBODIMENT

The contents of the invention will be explained in detail as follows based on the drawings, to which, however, embodiments of the invention are not limited.

EXAMPLE 1

Figure 1:
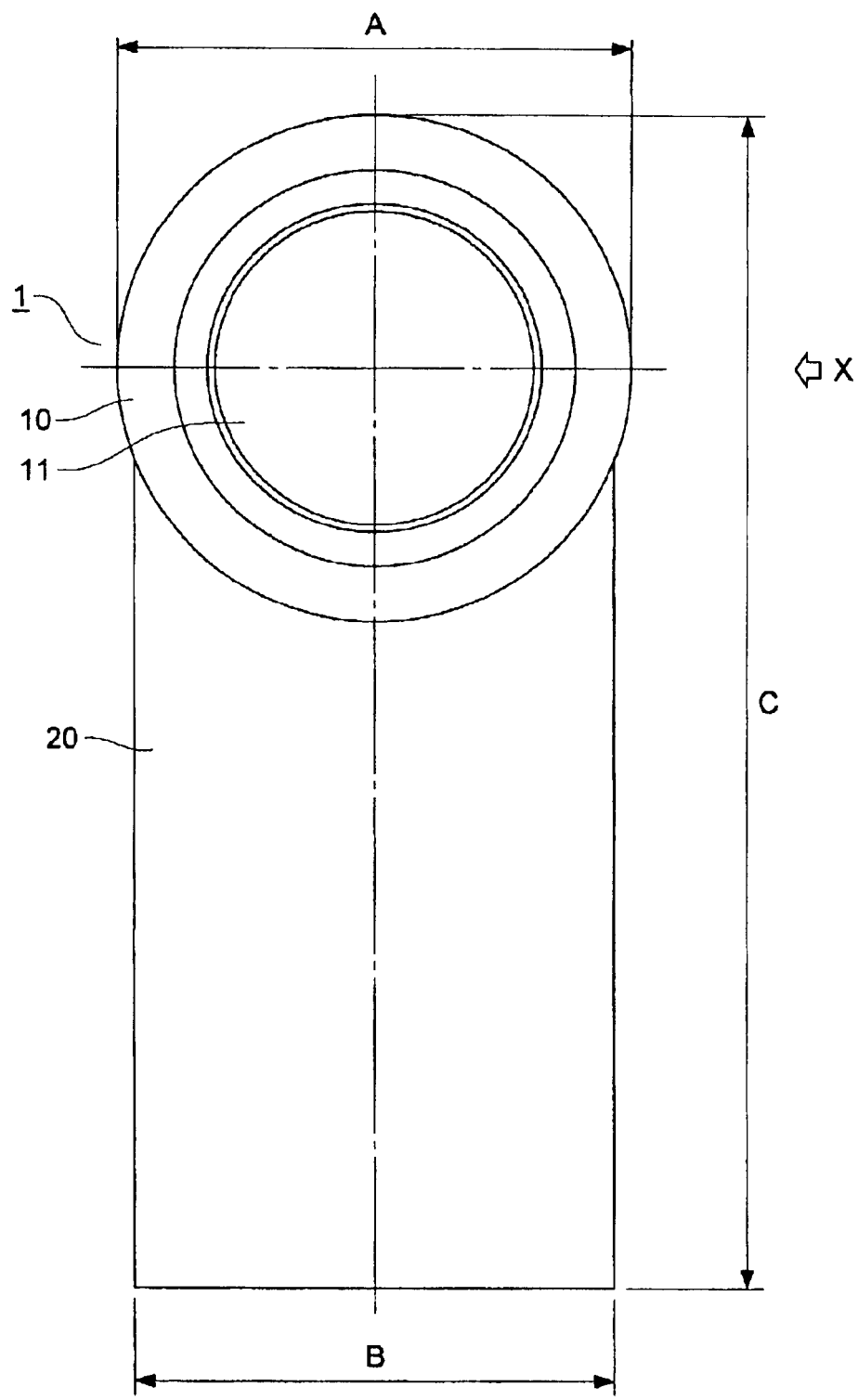
FIG. 1 is a diagram of an objective lens relating to Example 1 that is viewed in the direction of an optical axis.
Figure 2:
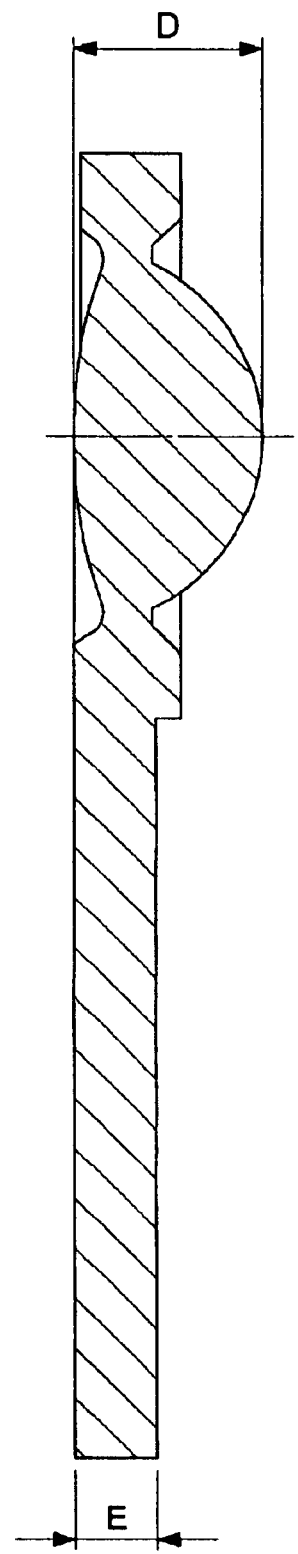
FIG. 2 is a diagram of the objective lens shown in FIG. 1 that is viewed in the direction shown with "a".

FIG. 1 is a diagram showing objective lens 1 in Example 1 viewed in the optical axis direction, and FIG. 2 is a sectional view showing the same objective lens viewed in the direction shown by the arrow (X).

The objective lens 1 is an objective lens made of plastic obtained by injection-molding resins filled in a metal mold.

Lens section 10 is composed of lens (optical functional surface) 11 having an optical function and of a flange section provided to surround the lens 11, and diameter A of the lens section 10 is 1.3 mm, while, the width of connecting section 20 is 1.2 mm. In the present example, B is equal to 0.92A, while, the conditions in Item (1-1) are satisfied, and the shape in Item (1-2) is kept.

Therefore, handling and incorporating in a pickup device are easy in spite of an extremely small lens, because a connecting section is provided for handling and for supporting the lens section, which is a merit. That is, the connecting section is used as a supporting section for the lens section. It is further possible to give a product name, a lot number and a metal mold number by conducting some printing and marking or other on the connecting section.

It is also possible to structure so that no flange section may be provided, however, it is preferable to provide a flange when positioning, handling, an influence on the lens surface and protection of the lens surface are taken into consideration.

The plastic lens which is injection-molded as stated above employs technologies in Item (1-18) and Item (1-19). Therefore, it is possible to manufacture a large number of lenses in the same shape stably and at high speed. In particular, the plastic lens has an advantage that inflow of resins and moldability are excellent because dimensional conditions stipulated in Item (1-1) are satisfied.

Further, a shape of the metal mold is formed so that resins may flow in from connecting section 20, and technologies in Item (1-3) and Item (1-18) are employed. Due to this, the shape and structure of the metal mold are not complicated, and a resin inflow path can be used as a constitutional component.

The lens section 10 is arranged so that it may be positioned when its flange section comes in contact with an unillustrated component on the part of a pickup device when the lens section 10 is incorporated in the pickup device, and NA is further stipulated as occasion demands on the optical functional surface of lens surface 11.

In the objective lens 1, technologies of Item (1-16) are employed for improving light-converging power, and the optical functional surface thereof is formed to be in a shape of an aspheric surface.

Further, for the purpose of temperature compensation (improvement of temperature characteristics), a diffractive structure is formed on the optical functional surface to be in a form of ring shaped zones by the use of technologies of Item (1-22). The diffracting surface may be provided either on the whole optical functional surface or on the desired locations at need. It is further possible to provide the diffracting surface not only for the temperature compensation but also for improvement of optical characteristics and for optical characteristics to be given, including correction of various aberrations.

When no diffracting surface is required in particular, optical functions may also be attained by a refracting interface only without providing the diffracting surface.

Incidentally, though the total length C including a lens section and a width section is 3 mm, maximum thickness D (axial thickness in this case) of the lens section is 0.41 mm and thickness E of the connecting section is 0.2 mm in the foregoing, these figures may further be selected suitably to be preferable.

As a comparison, a lens with a general view shown in FIG. 1 wherein a diameter of a lens section and a width of a connecting section are made to be different in terms of dimension was prepared to be studied. With respect to a size of the lens section first, when the size was smaller than that stipulated in the invention, insufficient quantity of light was caused, and sufficient optical efficiency was not attained. In addition, handling properties were lowered and assembling properties were worsened. Further, inflow of resins in the metal mold was worsened, and a yield for injection molding was lowered. When the size was greater than that stipulated in the invention, on the contrary, the lens was closer to an objective lens for CD or DVD available presently on the market, and it was difficult to downsize a recording medium and a pickup device, although optical characteristics were able to be attained. When the size of the connecting section was smaller than that stipulated in the invention, the resin inflow path was narrowed and resins did not flow in sufficiently, making injection molding itself to be impossible. When the connecting section was greater than that stipulated in the invention, on the contrary, a shrinkage cavity (defectively molded portion to which no resins flowed in) was caused on the connecting section, which also made it impossible to conduct excellent injection molding.

In comparison with lenses stated above, the objective lens that was made to be within a range stipulated by the invention proved to be excellent in terms of moldability and handling property and to be of no problem in optical efficiency after the objective lens was incorporated in a pickup device.

EXAMPLE 2

Figure 3:
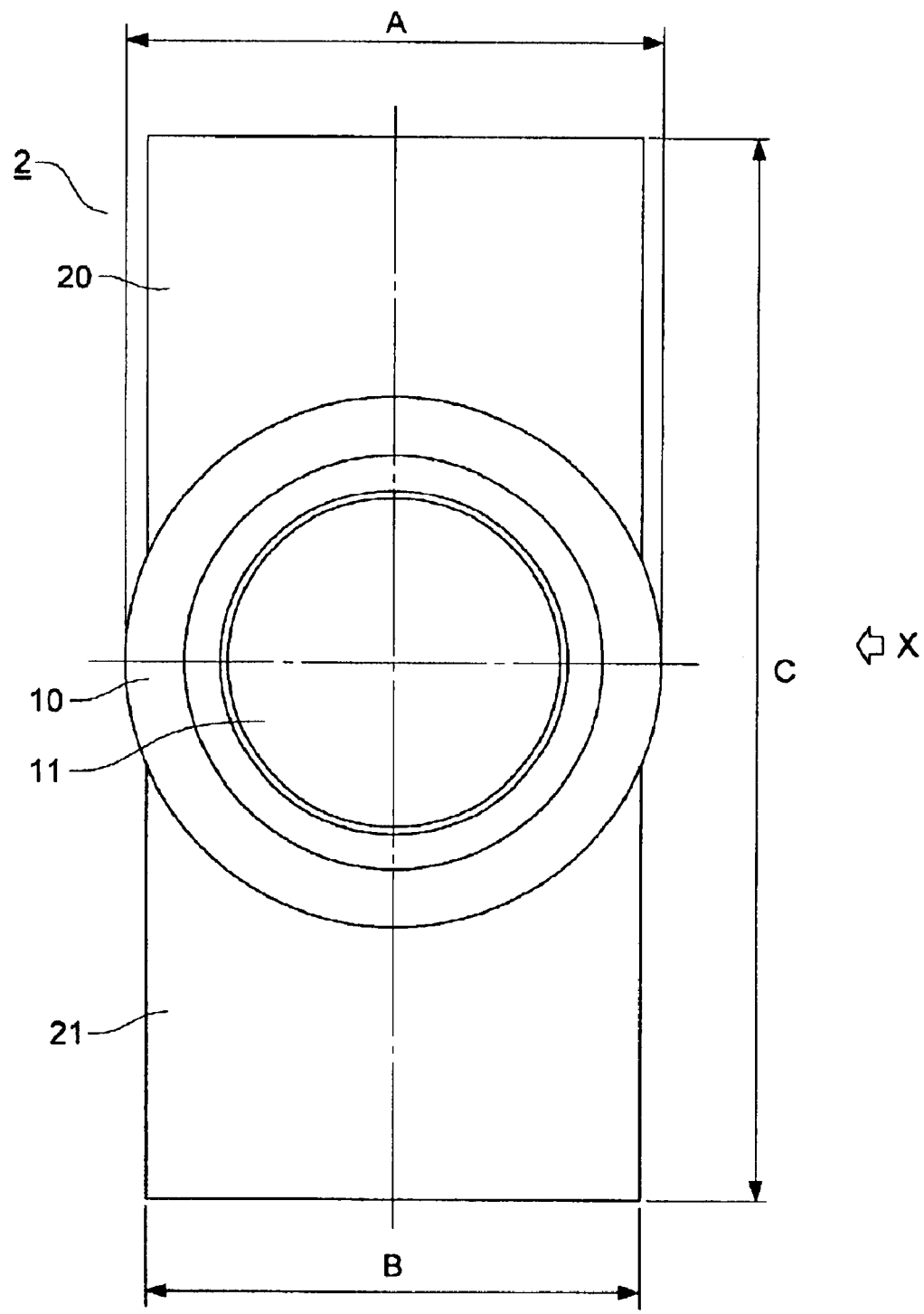
FIG. 3 is a diagram of an objective lens relating to Example 2 that is viewed in the direction of an optical axis.
Figure 4:
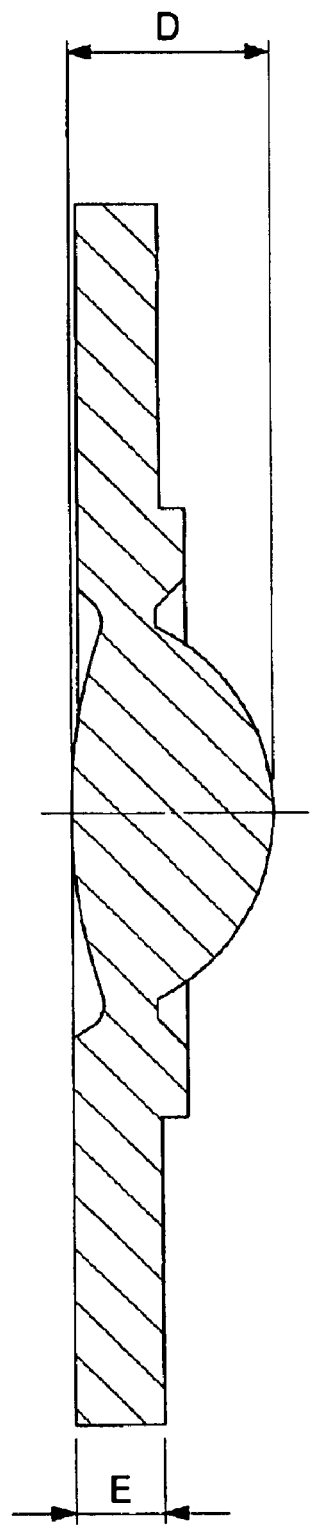
FIG. 4 is a diagram of the objective lens shown in FIG. 3 that is viewed in the direction shown with "a".

A general view shown in FIG. 3 represents a diagram of objective lens 2 made of plastic in Example 2 that is viewed in the direction of the optical axis, and FIG. 4 is a sectional view of the same objective lens viewed in the direction shown by the arrow (a), in which the technology of Item (1-4) is employed.

A point of difference between Example 1 and Example 2 is that second connecting section 21 is further provided in Example 2, and other points are the same as those in Example 1. Therefore, the same symbols are given to the same structure, and explanation therefore will be omitted.

Due to the two connecting sections provided, there are advantages that handling property is improved by holding both connecting sections and that an area where marking and printing can be conducted is increased.

Regarding these two connecting sections, it is either possible that at least one of 20 and 21 serves also as a resin inflow path as mentioned in Item (1-3) or Item (1-18), or possible that each of them serves also as a resin inflow path as mentioned in Item (1-11) and Item (1-12).

When both of the connecting sections are resin inflow paths, it is possible to form at high speed and surely because resins flow in at high speed, and to prevent occurrence of a shrinkage cavity. Further, the time required for injection molding can be reduced, and a cycle time is shortened, improving production efficiency.

Even when resins are made to flow in from the connecting section on one side, it is possible to form without any problem, provided that the dimensional conditions stipulated by the invention are satisfied.

Next, there will be explained an embodiment wherein a shape of connecting section 20 is different from that of connecting section 21.

When resins flow in from both of two connecting sections, resins which are unequal in terms of conditions meet in a metal mold, and a weld is naturally caused. If this weld interferes an optical functional surface of the lens section, optical functions themselves are affected, including a fall of transmittance and extension of errors in aspherical shapes. Therefore, it is necessary to devise proper arrangement.

Figure 5:
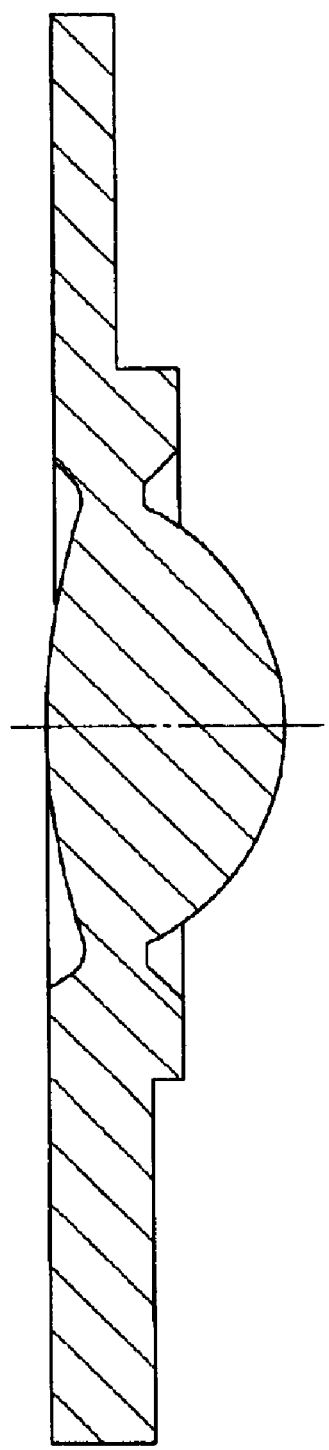
FIG. 5 is an example of an objective lens relating to Example 2.
Figure 6:
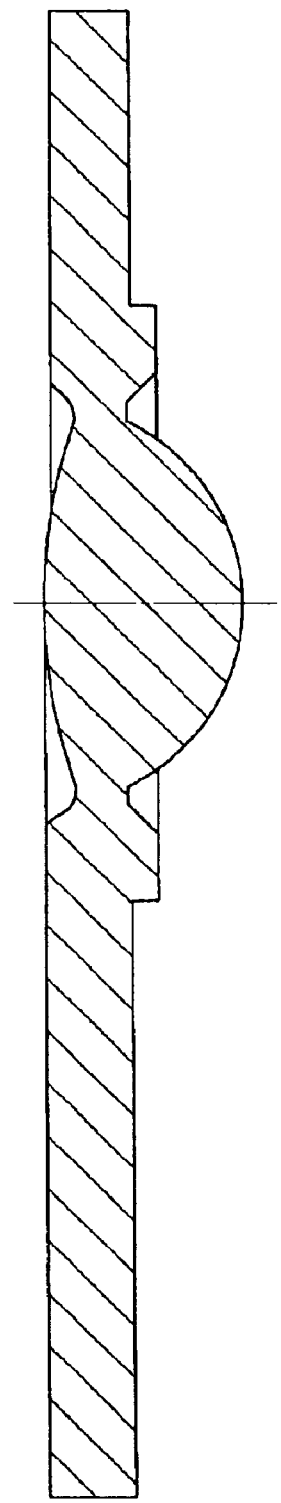
FIG. 6 is an example of an objective lens relating to Example 2.
Figure 7:
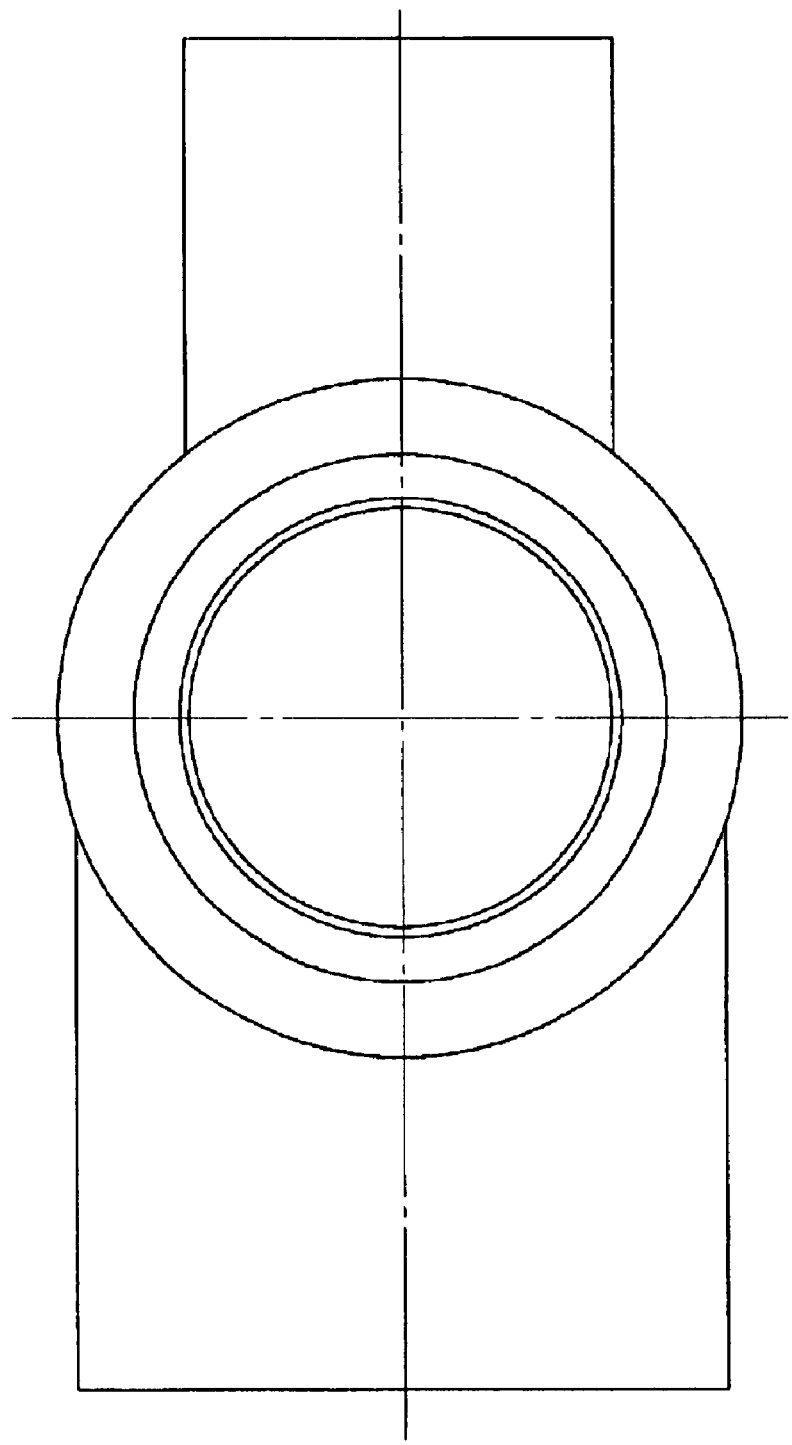
FIG. 7 is an example of an objective lens relating to Example 2.

As a method of solution from the aspect of a shape, it is an effective technology to make the connecting sections to be different in terms of size as shown in Item (1-5)–Item (1-10). As a practical method to make connecting sections to be different in terms of size, it is possible to employ a method to change a thickness in the direction of an optical axis, a method to change a length in the direction perpendicular to an optical axis and a method to change a length of a width viewed in the direction of an optical axis, by selecting properly or by combining them. To be concrete, shapes shown in FIGS. 5, 6 and 7 are conceivable. When a length of a width of the connecting section is made to be different, in particular, the length is required to be within the conditional range shown in Item (1-1).

By constituting as in the foregoing, meeting of resins is caused at a portion other than a lens section, because resins flowed in do not arrive the optical functional surface simultaneously. Accordingly, a weld is naturally positioned outside the optical functional surface.

In the example shown in FIG. 5, thicknesses of the connecting sections are made respectively to be 0.1 mm and 0.2 mm.

In the example shown in FIG. 6, lengths of the connecting sections are made respectively to be 0.65 mm and 1.3 mm.

In the example shown in FIG. 7, widths of the connecting sections are made respectively to be 0.8 mm and 1.2 mm. Incidentally, they correspond respectively to 0.92A and 0.62A, and they satisfy the condition of Item (1-1).

Next, as a solution from the aspect of a manufacturing method, there is a method wherein the time to start injecting resins is staggered as shown in the technology of Item (1-23).

With respect to resin injection to a metal mold, it is difficult to make each resin inflow speed for each resin inflow port to be different from others, when injection conditions including a melting temperature of resins are taken into consideration. Therefore, it is preferable that the time to start injecting resins is staggered, for controlling the meeting timing (meeting position) for both resins.

When the above-mentioned method is employed, it is possible to control the position of a weld without requiring a substantial cost increase.

Further, two connecting sections which are different each other in terms of a shape make it easy to grasp the direction of a lens, which is an advantage.

EXAMPLE 3

Figure 8:
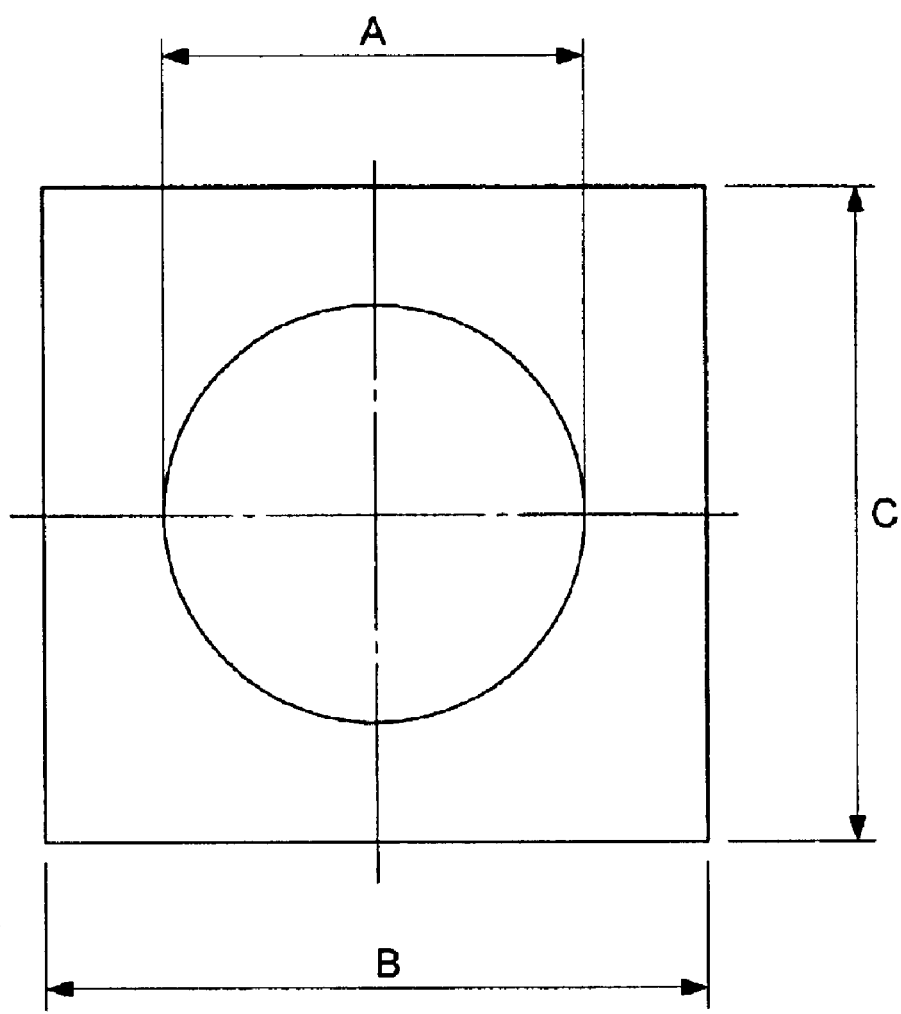
FIG. 8 is a diagram of an objective lens relating to Example 3 that is viewed in the direction of an optical axis.
Figure 9:
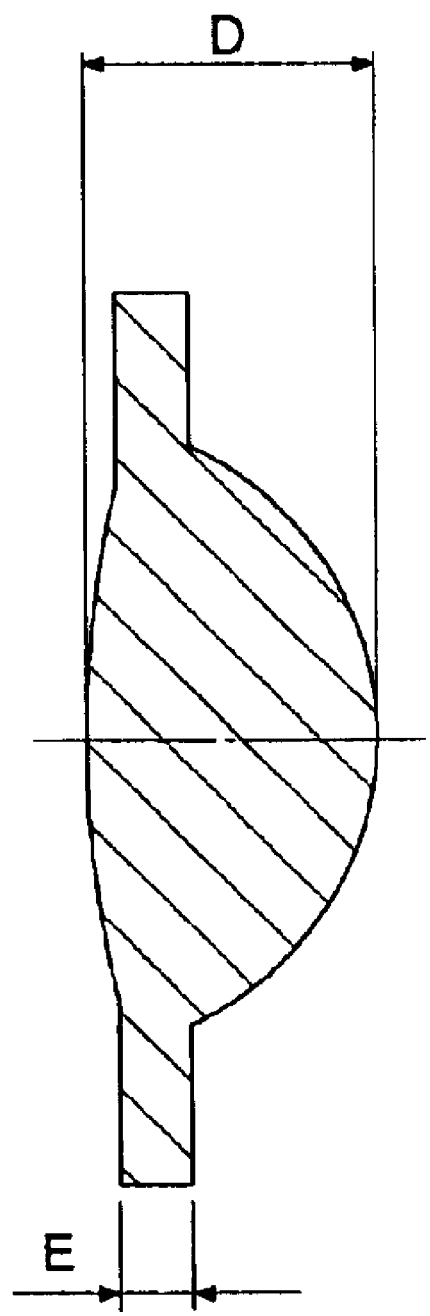
FIG. 9 is a diagram of the objective lens shown in FIG. 8 that is viewed in the direction shown with "a".

A general view shown in FIG. 8 represents a diagram of objective lens 2 in Example 3 that is viewed in the direction of the optical axis, and FIG. 9 is a sectional view of the same objective lens viewed in the direction shown by the arrow (a), in which the technology of Item (1-14) is employed.

In the structure of the present example, a lens section is provided in the form of a floating island at the center of the connecting section extending in a form of a square as a rectangular shape. The shape thereof is different from those of Examples 1 and 2, and dimensions of the connecting section are also determined based on the conditions in Item (1-1). Accordingly, there is no problem of injection molding. Since connecting sections are extending in almost all directions from the lens section, handling is more easy, and an area for data marking and printing is increased, which is an advantage. Further, when the connecting section is made to hit, it is easy to position both in x direction and y direction on the plane that is perpendicular to the optical axis, which is an advantage.

In the present example, a lens section is 0.85 mm, and a length of one side of the rectangular connecting section in the form of a square is 1.3 mm (1.53A), which satisfy the conditions in Item (1-1).

Though no flange is provided on the lens section, it is also possible to provide the flange.

Though a plastic lens is used in the same way as in Examples 1 and 2, a glass mold lens made through compression molding may also be used. In particular, the shape is suitable for compression molding, because of the shape wherein connecting sections are extending from the whole circumference of the lens section.

Further, the connecting section is in a shape of a square in the example shown in FIG. 8, but it is also possible to chamfer or to round the corner of the connecting section at need. If the extent of chamfering is made to be different depending on each corner, this may be utilized for adjusting the lens direction. Even when the rectangle is changed, as occasion demands, to a shape of a rectangle, a shape of a trapezoid, a shape of a parallelogram and a five-or-more-cornered rectangular shape, these shapes are naturally within a scope of the invention.

Incidentally, in the case of an asymmetric shape, an objective lens can be positioned easily and the direction of the objective lens can be determined easily.

When conducting injection molding for this lens, resins are also made to flow in through a part of the connecting section, and in this case, two or more inflow ports may be provided without sticking to one inflow port, as occasion demands, and it is also possible to change a thickness of the connecting section depending on its location.

EXAMPLE 4

An objective lens in Example 4 is exactly the same in terms of shape as those in FIGS. 1–9, and it is a glass lens obtained by heating a glass pre-form representing a material and then by compression-molding, in which technologies in Items (1-17) and (1-21) are used.

Since this is a glass lens, it is excellent in optical characteristics, and it is excellent also in temperature characteristics compared with a plastic lens.

Even in this lens manufactured through compression molding, it is necessary to satisfy the conditions in Item (1-1).

Namely, it is necessary that the pre-form is subjected to compression molding so that a lens section may have sufficient optical functions and a connecting section may be formed. If the width of the connecting section is out of the range of Item (1-1), there is caused a problem that no connecting section is formed, or molding troubles are generated in a lens section in an extreme occasion.

Therefore, even when a small-sized lens is made with glass material through compression molding, if the shape of the lens satisfies the conditions specified in Item (1-1), excellent molding can be carried out.

As stated above, the inventions in Items (1-1) and (1-2) offer an advantage that handling and incorporating in a pickup device are easy. An advantage that inflow of resins and moldability are excellent is also offered. Even in the case of compression molding, an excellent lens is obtained if this condition is satisfied.

In the invention in Item (1-3), the shape and structure of the metal mold are not complicated, and a resin inflow path can be used as a constitutional component.

In the invention of Item (1-4), when the lower limit value of the relational expression described in Item (1-4) is exceeded downward, materials do not flow in smoothly and moldability is worsened. When the upper limit value is exceeded upward, on the other hand, a width of a connecting section is broadened, resulting in an increase of the time required for cutting work of the connecting section and an increase of lens load, which is not preferable from the viewpoint of a thermal strain.

In the invention of Item (1-5), each individual lens is cut to be in a circular shape, and it can be subjected to rotary adjustment, and can be mounted easily.

In the invention in Item (1-6), there are advantages that handling property is improved by holding both connecting sections and that an area where marking and printing can be conducted is increased.

The inventions in Items (1-7)–(1-10), meeting of resins is caused at a portion other than a lens section, because resins flowed in do not arrive the optical functional surface simultaneously. Accordingly, a weld can naturally be positioned outside the optical functional surface.

In the invention in Item (1-11), since connecting sections are extending in almost all directions from the lens section, handling is more easy, and an area for data marking and printing is increased, which is an advantage. Further, when the connecting section is made to hit, it is easy to position both in x direction and y direction on the plane that is perpendicular to the optical axis, which is an advantage.

In the case of filling resins through a plurality of injecting ports in Item (1-12) and in the case of the inventions in Items (1-11) and (1-12), it is possible to mold surely and at high speed, and to restrain occurrence of a shrinkage cavity. In addition, the time required for injection molding can be shortened, which makes a cycle time to be shorter, resulting in improvement of production efficiency.

Further, two connecting sections which are different each other in terms of a shape make it easy to grasp the direction of a lens, which is an advantage.

In the invention in Item (1-15), a weld is located outside an optical functional surface, which makes it possible to obtain a lens having excellent optical characteristics.

In the invention in Item (1-16), it is possible to obtain a lens having excellent optical characteristics.

In the invention in Item (1-17), it is possible to manufacture a large number of lenses in the same shape stably and at high speed.

In the invention in Item (1-18), it is possible to manufacture a large number of lenses in the same shape stably and at high speed. Since the dimensional conditions stipulated in Item (1-1) are satisfied, in particular, inflow of resins and moldability are excellent, which is an advantage.

In the invention in Item (1-19), the shape and structure of the metal mold are not complicated, and a resin inflow path can be used as a constitutional component.

In the invention in Item (1-20), it is possible to manufacture a large number of lenses in the same shape stably and at high speed. Since the dimensional conditions stipulated in Item (1-1) are satisfied, in particular, inflow of resins and moldability are excellent, which is an advantage.

In the invention in Item (1-21), it is possible to obtain a lens that is excellent in temperature characteristics and in transmittance.

In the invention in Item (1-22), it is possible to give desired optical power by a diffractive surface.

In the invention in Item (1-23), it is possible to control the position of a weld without requiring a substantial cost increase.

Next, based on the drawings, there will be explained in detail the molding process of the invention to which, however, the invention is not limited.

The characteristic of the invention is to form integrally a optical molded component P which is greater in terms of volume and weight than the lens that is incorporated finally in the optical pickup unit, in advance, then, to handle the molded component in the handling process by holding its portion other than the lens as a reference position, and to cut the portion other than the lens after incorporating the molded component in the optical pickup unit or in the containing cartridge.

Figure 10:
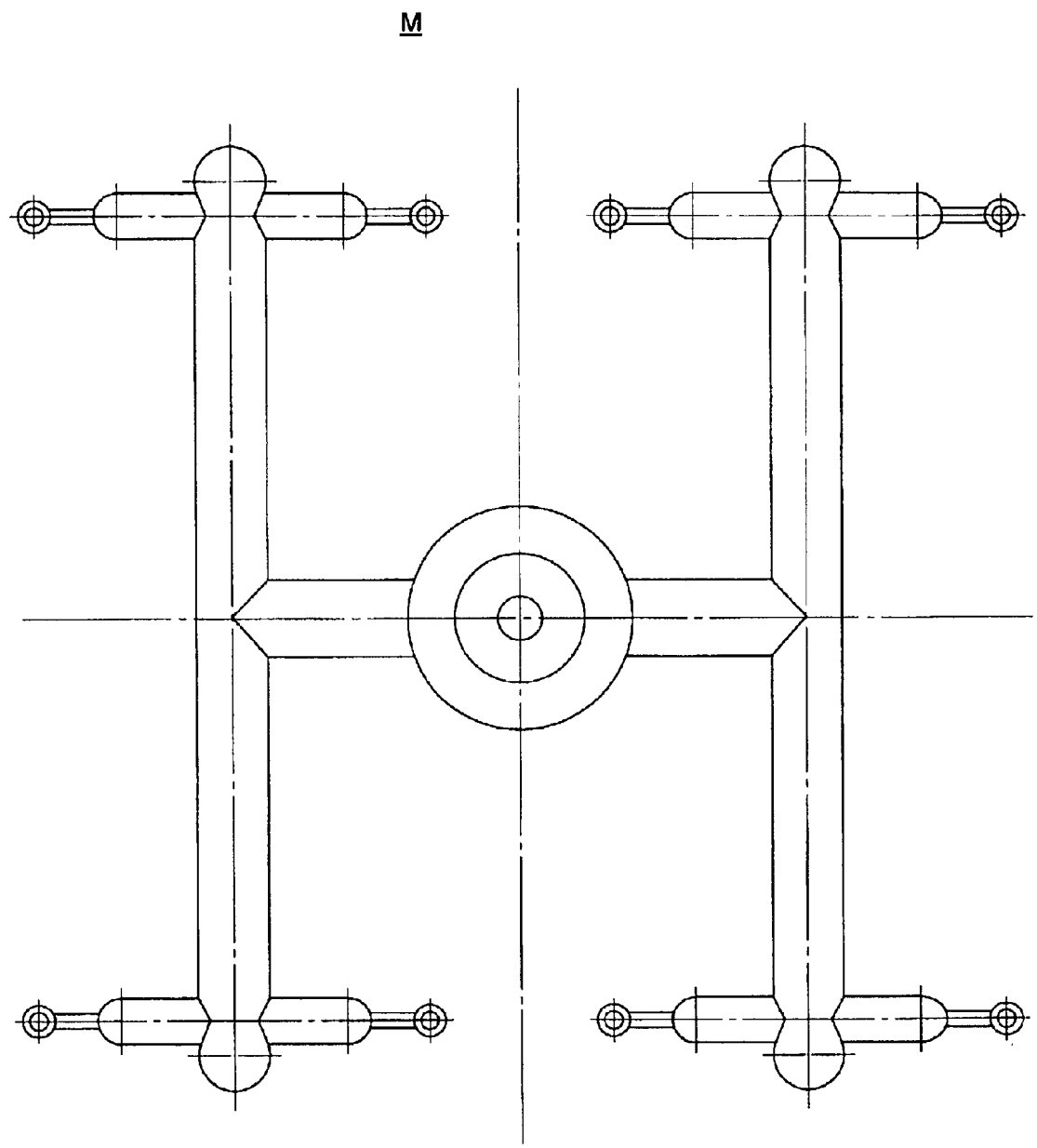
FIG. 10 shows a schematic view of the metal mold relating to the invention.

The symbol O shown in FIG. 10 represents a schematic view of a part of a metal mold M that is used for molding an optical molded component P relating to the invention. The metal mold has a resin inflow path which is mostly H-shaped, and it is the so-called multi-cavity metal mold (8-cavity, in this case) wherein melted plastic resin flows in the large diameter path section located at the center, in the direction perpendicular to the page, and 8 pieces of optical molded components in total are formed in a single metal mold. As is known commonly, the metal mold is composed of a fixed side and a movable side, and these sides are closed when resin flows in, and are parted to open the inside of the metal mold when the resin is cooled after flowing in and molding is completed, so that the molded component may be taken out.

Figure 11:
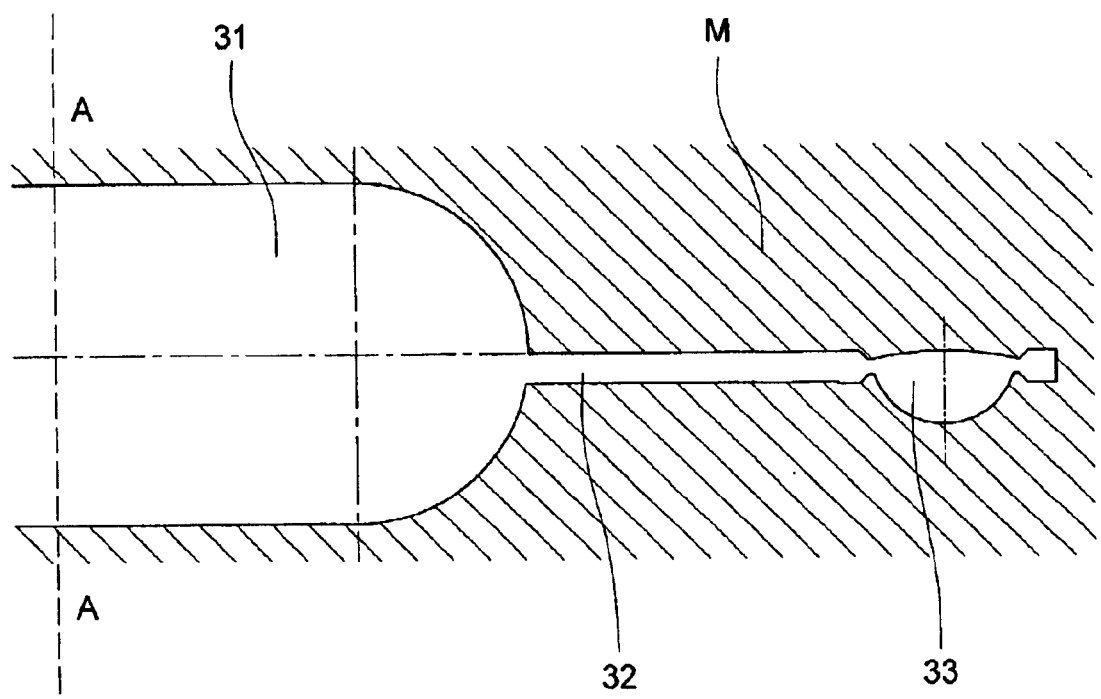
FIG. 11 is an enlarged drawing of primary portions of the metal mold relating to the invention.

FIG. 11 is a sectional view of a certain molding site (including the fixed side and movable side) that is viewed in the direction 1 in the metal mold. The numeral 31 represents a runner that is the first resin inflow path, 32 represents a gate that is the second resin inflow path and 33 represents an optical functional section molding section. A section of the first resin inflow path is circular and a section of the second resin inflow path is rectangular.

As is known commonly, an inner surface of the metal mold, namely, the molding surface has surface finish conducted by any of various types of processing methods. The optical functional section molding section, in particular, can be structured so that not only an aspheric surface but also diffractive ring-shaped zones, phase-shifted ring-shaped zones and optical path difference provided ring-shaped zones may be formed, and in that case, a cutting tool having an extremely sharp edge is used to machine the metal mold. As a material for the metal mold, appropriate materials including plated iron can be selected.

Though a section of the first resin inflow path (runner) is circular and has a uniform diameter in the drawing, a diameter and a shape of this runner section do not always need to be uniform. With respect to a cross-sectional area and a shape, a diameter, for example, may either be changed from 6 to 4 discontinuously or be changed from 6 to 4 continuously to become a tapered shape. Further, a shape of a section may suffer a change such as a change from a circle to a rectangle.

Then, the melted resin flows in the second resin inflow path 32 from the first resin inflow path 31, and further flows in the optical functional section molding section 33 through the second resin inflow path 32, and is cooled, thus, molding is completed and the metal mold is opened.

In this example of the metal mold, the inflow direction of the resin is linear for both the first resin inflow path and the second resin inflow path, and both directions agree with each other.

Figure 20:
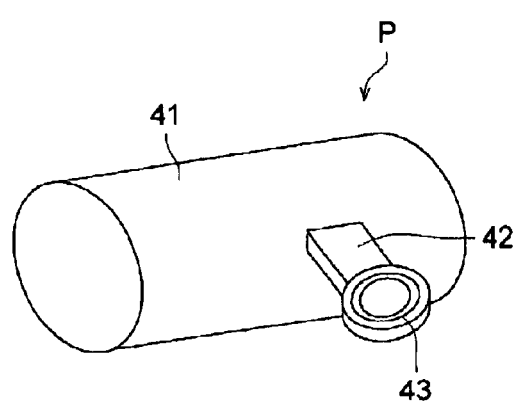
FIGS. 20(a) and 20(b) each is a perspective view of an example of the molded component relating to the invention.
Figure 20:
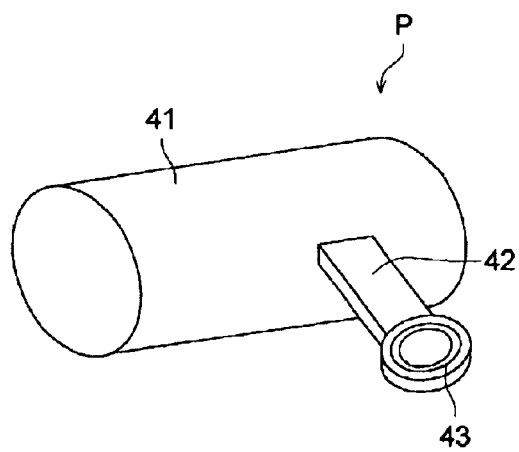

However, the aforementioned structure may be changed to comply with the total structure of the metal mold and with other circumstances. For example, it is possible to make the first resin inflow path to have a prescribed curve. Further, it is possible to make the resin inflow direction of the first resin inflow path and that of the second resin inflow path to be linear, and further to make them to be in the positional relationship to cross at right angles. Under this condition, a metal mold takes a three-dimensional shape, resulting in an advantage that the number of cavities is increased. For example, a shape of the molded component that is molded by the use of the metal mold mentioned above is one shown in FIG. 20.

An optical molded component P formed by metal mold M shown in FIG. 10 is formed to be in a shape shown in FIG. 10.

With respect to each section formed by metal mold M in this case, a diameter of supporting shaft section 41 is 5 mm, a shape of a section of connecting section 42 is a rectangle whose one side is 0.5–1 mm and a diameter of optical functional section 43 is 1 mm–1.5 mm.

Therefore, it is extremely difficult to handle by holding directly the optical functional section 3 that represents a lens site. However, it is easy to hold supporting shaft section 41 that is formed by the first resin inflow path 31 (runner) by handling it as a reference, and other operations can be conducted satisfactorily.

To be concrete, the supporting shaft section 1 is handled as a reference for various operations, including holding (grasping) and conveyance in the case of taking out the molded component by opening the metal mold, holding (grasping), conveyance, positioning and attaching (or incorporating or assembling) to another member after taking out, and holding (grasping) for cutting.

The molded component formed by the metal mold 0 is cut at the position shown by AA' in FIG. 11.

Figure 12:
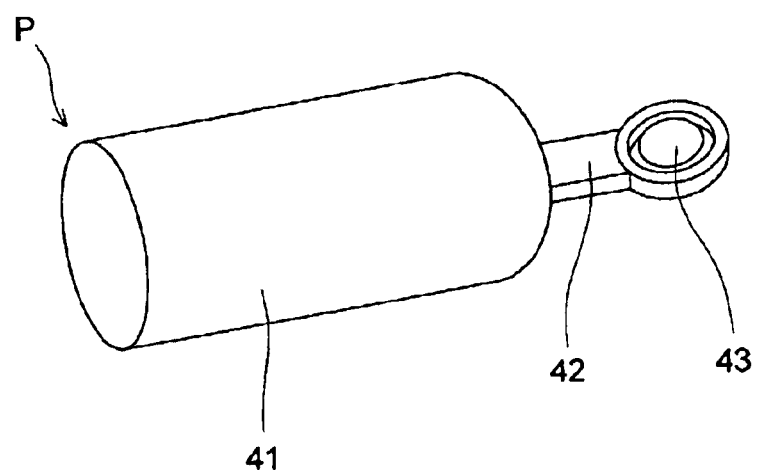
FIG. 12 is a perspective view of the molded component relating to the invention.

Shape P of the optical molded component that has been cut at the position AA' is shown in FIG. 12.

In the figure, the numeral 41 represents a supporting shaft section formed by the first resin inflow path 31 (runner), 42 represents a connecting section (or a cross linkage section) formed by the second resin inflow path 32 (gate) and 43 represents an optical functional section formed by the optical functional section molding section 33.

As explained earlier, what is incorporated actually in the equipment such as an optical pickup unit is the optical functional section 43 which is extremely small as stated above and is difficult to be handled individually. Therefore, it is conveyed under the condition of molded component P wherein it is united solidly with supporting shaft section 41 and connecting section 42, and it is cut at the position of the connecting section 42 immediately before it is incorporated in the optical pickup unit finally or after being incorporated, so that the optical functional section 43 may be mounted on the optical pickup unit. It is further possible for the connecting section 42 to be cut after the molded component P has been housed in a cartridge for conveyance.

Further, when considering a size of supporting shaft section 41—optical functional section 43, it is preferable that the supporting shaft section 41 and the connecting section 42 are naturally greater in terms of weight than the optical functional section 3 in the molded component P, for conducting various types of handling stated above.

It is further preferable that the total weight of supporting shaft section 41 and connecting section 42 is not less than 70% of the whole weight.

In other words, an optical molded component mentioned in Item (2-35) is one like molded component P in the state including a supporting shaft section, a connecting section and an optical functional section in FIG. 12, for example, and it is not one showing the state of molding after the fixed section and the movable section are parted after completion of the molding in the metal mold shown in FIG. 10.

Incidentally, for making the handling of the optical molded component after the molding to be more easy, it is possible to improve the shape of the metal mold by which the molded component P is molded.

Figure 13:
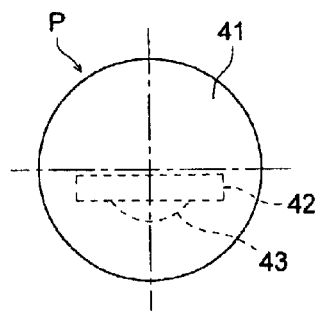
FIGS. 13(a) to 13(g) each is a sectional view of the molded component relating to the invention.
Figure 13:
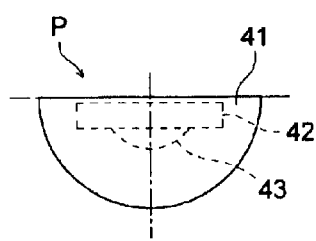
Figure 13:
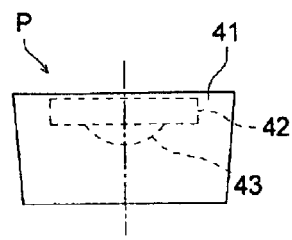
Figure 13:
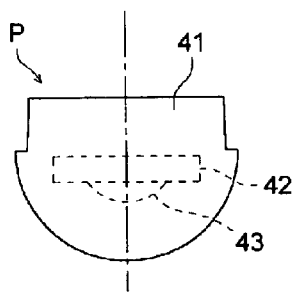
Figure 13:
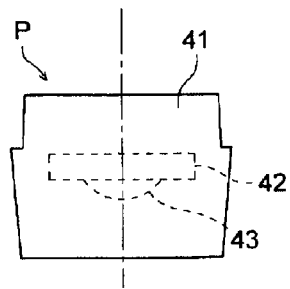
Figure 13:
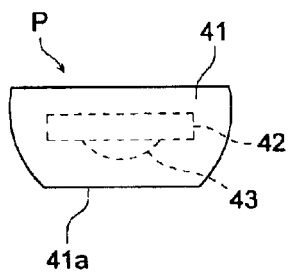
Figure 13:
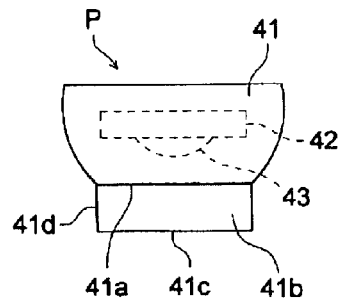

FIG. 13 shows variations of sectional shapes for the first resin inflow path 31 (runner) shape. FIG. 13(a) shows a circle, FIG. 13(b) shows a semicircle and FIG. 13(c) shows a trapezoid that is symmetrical laterally. When an asymmetric shape like FIG. 13(b) or FIG. 13(c) is used, it is possible to prevent that supporting shaft section 41 rolls down when it is placed on the stand. Further, in the case of registering, the shape itself serves as an index, which is an advantage.

It is further possible to employ the shapes of FIG. 13(d) and FIG. 13(e), taking handling property, moldability and stiffness of the finished molded component into consideration as other factors.

FIG. 13(d) shows a shape of a section in which a rectangular portion (a trapezoid portion that is symmetric laterally) is provided on a chord of the semicircle. Due to this shape, stiffness is enhanced, rotation can be prevented and positioning can be conducted easily.

FIG. 13(e) shows a shape of a section in which a plurality of trapezoids each being symmetric laterally are combined. Due to this shape, stiffness is enhanced, rotation can be prevented and positioning can be conducted easily.

Optical molded component P shown in FIG. 13(f) is one wherein parallel flat portion 41a that is almost in parallel with a chord section is formed on a part of an arc section of supporting section 1. Prevention of its rotation is possible, and positioning thereof is easy. Further, by making this parallel flat portion 41a to be a fixed side of metal mold M, and by making the chord section to be a movable side of the metal mold M, the optical molded component P can be removed easily from the fixed side after molding by the metal mold M. Due to this, deformation of supporting section 1 caused in the course of removing can be controlled, and excellent optical molded component P can be obtained.

Figure 21:
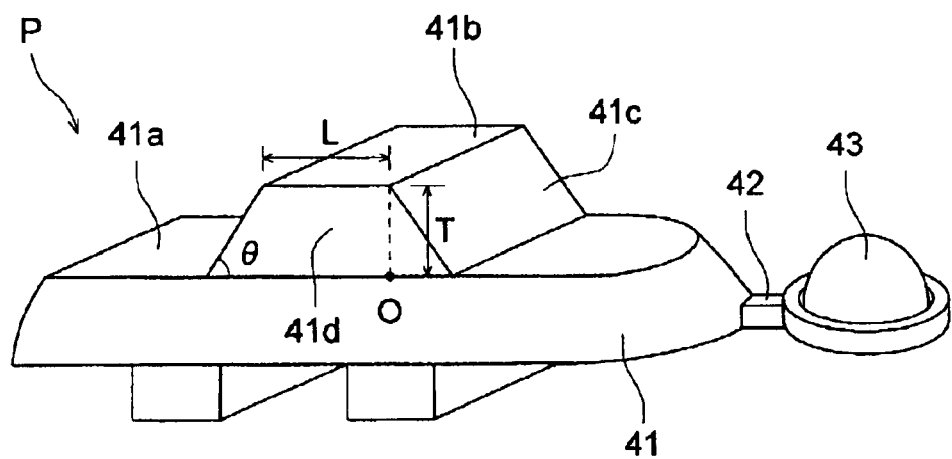
FIGS. 21(a) and 21(b) each is a perspective view of an example of the molded component relating to the invention.
Figure 21:
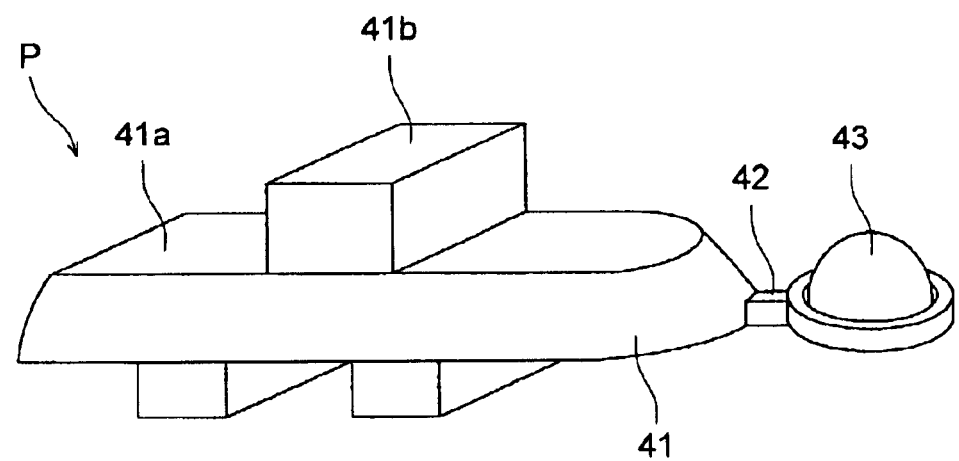

Further, it is also possible to provide protruded portion 41b in a shape which is almost truncated square pyramid (so-called tapered shape) on the parallel flat section 41a, as shown in FIG. 13(g) and FIG. 21(a). This protruded portion 41b has a pair of longitudinal sides 41c which face each other in the longitudinal direction of the supporting section 41 and a pair of lateral sides 41d which face each other in the lateral direction. Incidentally, the corner section of the protruded portion 41b is chamfered to make the removing from the metal mold M to be excellent. This chamfering may either be in a cornered shape or be in a rounded shape, but the rounded shape is better on the point of releasability. When the structure shown in FIG. 13(g) is employed, action and effect in the case of the structure shown in FIG. 13(f) can naturally be exhibited, and further, positioning by using the protruded portion 41b is possible. Incidentally, protruded portion 41b may also be formed to be in a shape of a rectangular parallelepiped without being in a shape of almost truncated square pyramid, as shown in FIG. 21 (b).

Figure 22:
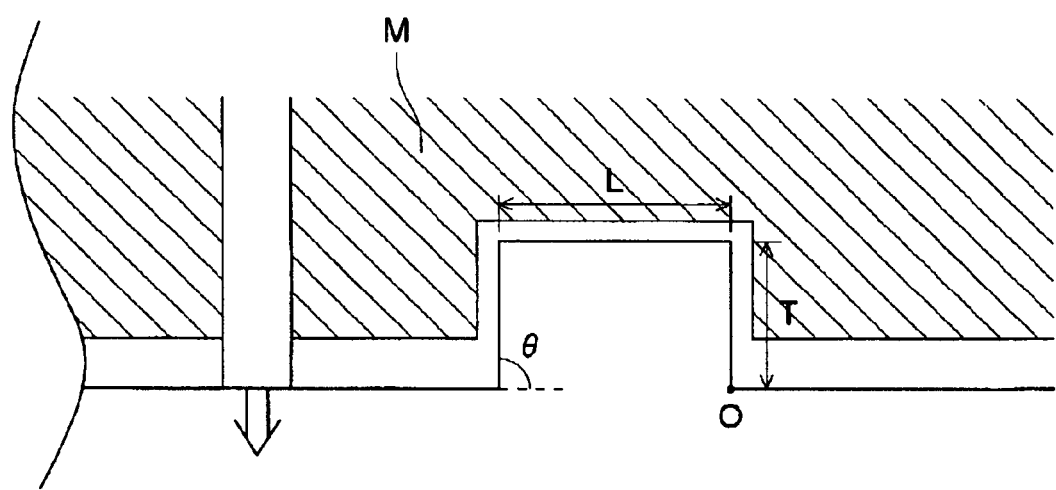
FIG. 22 is a sectional view explaining the separation of an optical molded component from a mold.

As shown in FIG. 22, when O represents an intersecting point of a straight line suspended vertically from the side end portion of connecting section 42 of a pedestal section of the protruded portion 41b to the parallel flat portion 41a and the parallel flat portion 41a, when the metal mold M is opened, there is generated moment whose center is on O on supporting section 41. Namely, it is preferable that angle θ formed between parallel flat portion 41a and longitudinal side 41c is not more than an angle which creates a tangent line of the circle whose center is at O and whose radius is $(L^2+T^2)^{1/2}$, when L represents a length of a pedestal portion of the protruded portion 41b in the longitudinal direction and T represents a length of protruded portion of 41b in the direction of its height. Namely, when the angle θ is made to be 45° or less, the moment generated in the supporting shaft portion 41 is reduced, and releasability is improved greatly. Incidentally, the smaller the angle θ is, the more the releasability is improved. In addition, the releasability is further improved if the joint section between the longitudinal side 41b and the parallel flat portion 41a is made to have a radius of curvature that makes a gentle curve.

When a semicircular shape like FIG. 13(b) is employed, in particular, if an arrangement is made so that a normal line on the chord section of the semicircle may agree with an optical axis on an optical functional surface of optical functional section 43, it is possible to conduct positioning easily in the case of mounting by utilizing the surface corresponding to the chord section, which results in the handling that is more convenient.

When considering the relationship between the optical functional section and an optical axis, shapes of FIGS. 13(a)–13(g) can also be applied, without being limited to the shape of FIG. 13(b). Namely, in the case of a trapezoidal shape that is symmetric laterally, a line that is perpendicular to prarallel two sides of the trapezoid has only to agree with an optical axis of the optical functional section.

Figure 14:
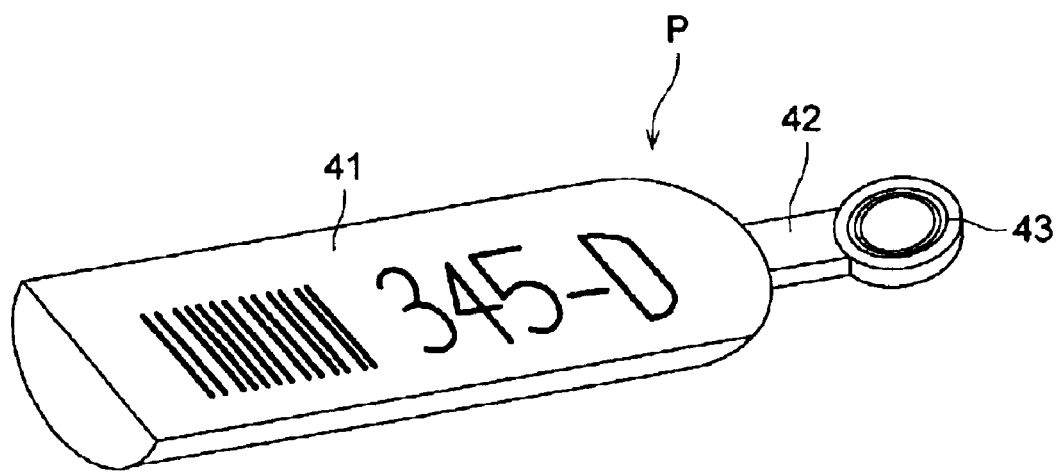
FIG. 14 is a perspective view in the state where information is given to the supporting shaft section of the molded component relating to the invention.

Further, as another improvement, it is also possible to provide a three-dimensional distinguishing mark on supporting shaft section 1 through molding as shown in FIG. 14. In this case, the first resin inflow path 31 (runner) of the metal mold is processed in advance so that the distinguishing mark may be formed thereon.

Now, as shown in FIGS. 18(c) and 18(d), index portion 42a may be provided on connecting section 42. In this case, gate 2 of the metal mold M has only to be machined in advance so that the index portion 42a may be formed on connecting section 42.

In the example shown in FIG. 14, there are formed bar code and letters. A direction, a size and a shape of these distinguishing mark can be established independently.

Incidentally, although the bar code and the letters are formed on the supporting section 41 in FIG. 14, the bar code and the letters may be formed on the connecting section 42.

Further, the distinguishing mark like this can also include a metal mold number and a cavity number in addition to symbols indicating a product name and a lot. If these distinguishing marks are included, it is possible to use them when checking and extracting defective products in the succeeding process.

Further, as shown in FIGS. 18(c) and 18(d), index portion 42a that is based on a distance from the center of an optical axis of the optical functional section 43 may be provided on connecting section 42. FIG. 18(d) shows that the index portion 42a is formed by cutting into the connecting section 42, while, FIG. 18(c) shows that the index portion 42a is formed to be protruded from the connecting section 42. Further, FIG. 18(d) shows that the index portion 42a is formed to be in a shape of a straight line that extends in the lateral direction of the connecting section 42. FIG. 18(c) shows that the index portion 42a is formed to be a locus of a circle having a prescribed radius whose center is on the optical axis. Due to this, it is possible to cut based on the index portion 42a when cutting the connecting section 42.

Figure 15:
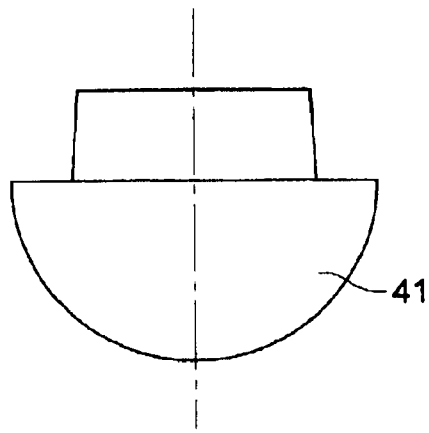
FIGS. 15(a) to 15(d) each is a sectional view of an example wherein a three-dimensional distinguishing mark is provided on the supporting shaft portion of the molded component relating to the invention.
Figure 15:
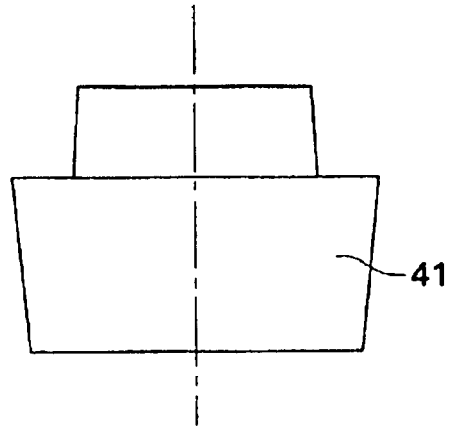
Figure 15:
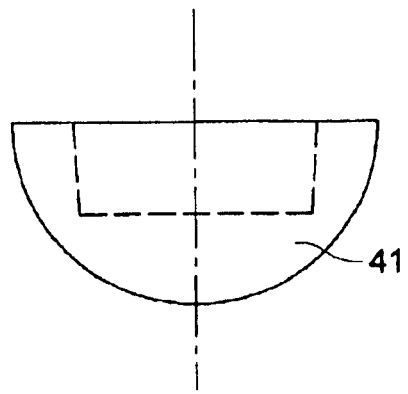
Figure 15:
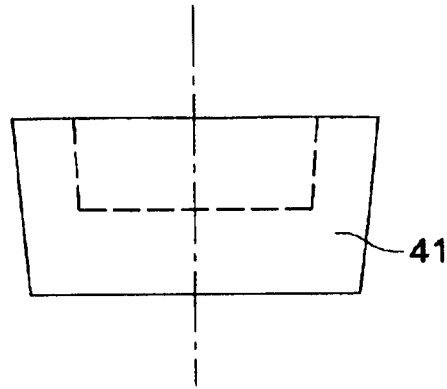
Figure 16:
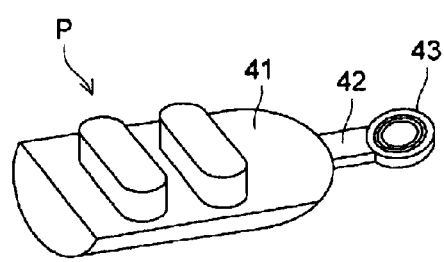
FIGS. 16(a) to 16(g) each is a perspective view of an example wherein a three-dimensional distinguishing mark is provided on the supporting shaft portion of the molded component relating to the invention.
Figure 16:
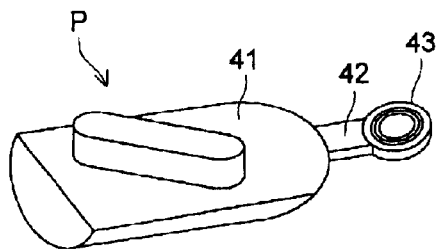
Figure 16:
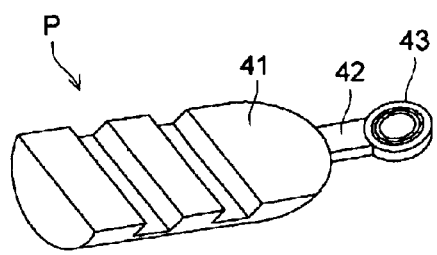
Figure 16:
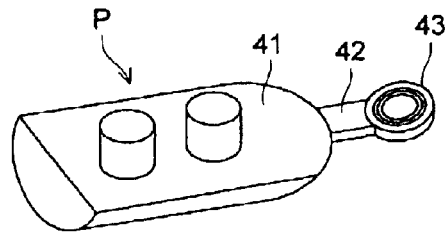
Figure 16:
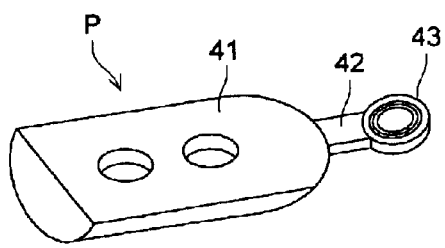
Figure 16:
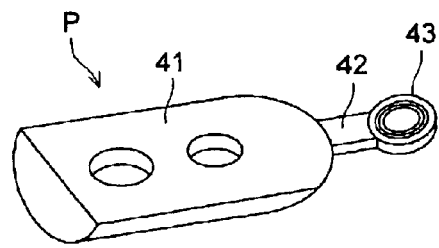
Figure 16:
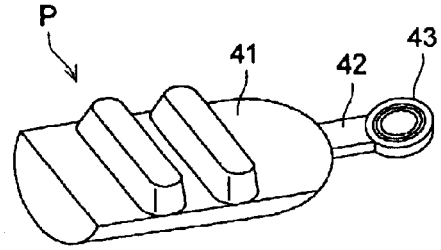
Figure 17:
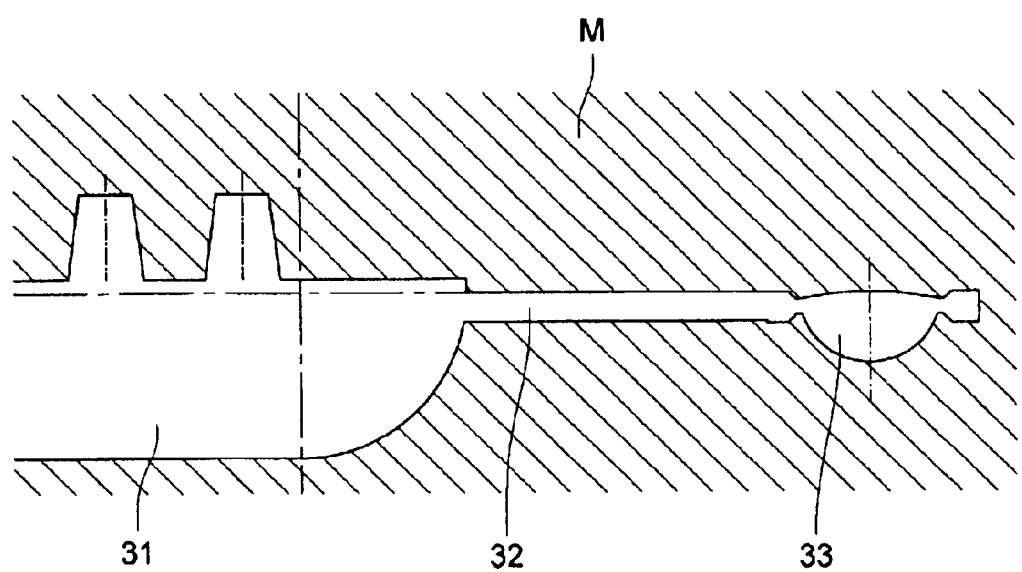
FIG. 17 is a sectional view of a metal mold wherein a three-dimensional distinguishing mark is provided on the supporting shaft portion of the molded component relating to the invention.

Further, as another improvement, a concave portion or a convex portion may be provided on the supporting shaft section 41 as shown in FIG. 15 and FIG. 16. Even in this case, the first resin inflow path 31 (runner) of the metal mold is processed so that these portions may be formed thereon as shown in FIG. 17.

These concave portions and convex portions can be used as a mark for positioning, a stand for placing and as a jig for fixing. For example, a conveyance guide such as a rail is provided, and when conveying molded component P in a way that it slides on the rail, if the concave portion and/or convex portion and the rail are in the state of loose fitting, the molded component P does not come off the rail. Even in the case of storing the molded component P in a housing container such as a cartridge, if the concave or convex portion is in the state of fitting with a member on the housing container, a problem of coming off or damage of the molded component in the container can be solved.

In this case, the convex portion may be formed to be in a shape that is almost a truncated square pyramid as shown in FIG. 16(g), or if a corner section of the convex portion is chamfered, friction with a rail can be reduced. If the chamfering in this case is in a rounded shape as shown in FIG. 16(g), friction can be reduced greatly, which is extremely advantageous in practical use.

Figure 18:
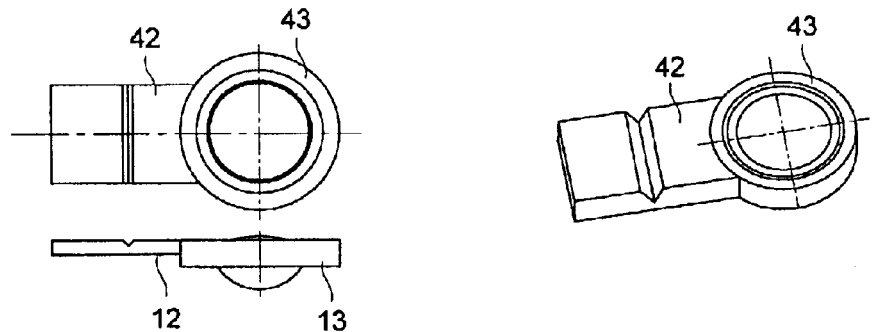
FIGS. 18(a) to 18(d) each is an enlarged drawing of primary portions of the example wherein a stress-concentration portion is provided on the connecting section of the molded component relating to the invention.
Figure 18:
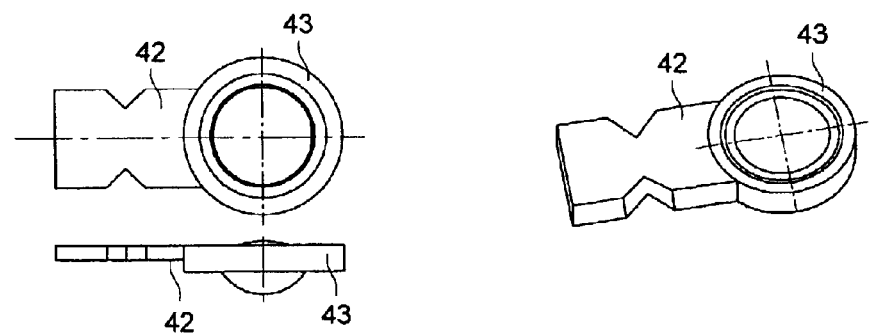
Figure 18:
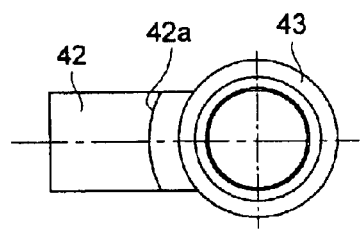
Figure 18:
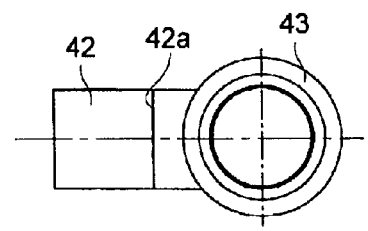

Further, as another improvement, it is possible to provide a stress concentration portion on connecting section 2 as shown in FIG. 18, so that the connecting section 2 may be cut easily.

If there is formed a V-shaped concave portion that is concave in the direction that is almost perpendicular to an optical axis on an optical functional surface of optical functional section 43, as shown in FIG. 18(a), it is possible to cut connecting section 42 only by tilting supporting shaft section 41 in the direction of the optical axis after incorporating the molded component P in an equipment such as an optical pickup unit. It is also possible to provide a V-shaped concave portion that is concave in the direction which is mostly the same as an optical axis on the optical functional surface of the optical functional section 43, as shown in FIG. 18(b).

Though it is possible to provide the stress concentration portion of this kind by arranging some device on the metal mold, in the same way as in the aforementioned case, there is sometimes caused a problem because a cross-sectional area of the path through which the resin passes becomes small in the second resin inflow path 32. It is therefore possible to form a stress concentration portion of this kind through half-cutting or stamping after completion of molding.

Though there has been explained a technology to make handling after molding to be easy by improving mainly a metal mold, it is also possible to devise the handling in the state of molded component P, after molding.

For example, in the example shown in FIG. 14, a distinguishing mark is provided on supporting shaft section 41 by devising a shape of the first resin inflow path 31, in which, however, a problem that information to be given in the course of molding is fixed is caused.

After molding, therefore, some pieces of information can be given. Recording of information of this kind is also an embodiment of what is called "handling" in the invention.

Figure 19:
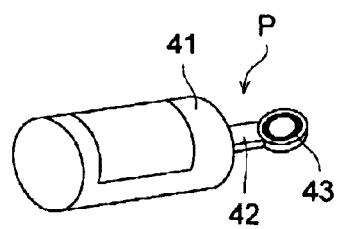
FIGS. 19(a) and 19(b) each is a perspective view of an example wherein an information recording site is provided on the supporting shaft portion of the molded component relating to the invention.
Figure 19:
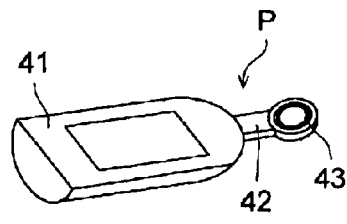

As an example therefore, there is given an occasion wherein the first resin inflow path 31 is processed to provide an information recording site as shown in FIG. 19. In this case, it is preferable that an area representing a rough surface is formed so that an operation to give information and a position to give information may be distinguished. Incidentally, by processing the gate section 31, the information may be provided on the connecting section 42.

A method to give information includes, for example, stamping, printing and pasting of a label. When simplicity and cost are taken into consideration, in particular, printing of an ink jet system is preferable. It is also possible to combine stamping, printing and pasting of a label appropriately for using them.

Further, as information to be given or to be recorded, it is possible to include also a metal mold number and a cavity number in addition to symbols indicating a product name and a lot. If these distinguishing marks are included, it is possible to use them when checking and extracting defective products in the succeeding process.

In the case of printing and label pasting, classification by coloring can also increase an amount of information.

As stated above, in the invention of Item (2-1) and Item (2-2), it is possible to hold stably because weight of the portion other than the optical functional section is greater than that of the optical functional section.

In the invention of Item (2-3), Item (2-4), Item (2-35)–Item (2-38), information is recorded on the supporting shaft section which is larger than the optical functional section, therefore, various pieces of information can be held as a molded component even in the case of a small-sized optical functional section. If the recorded information is a metal mold number, it is possible to trace the relationship between the molded component and the metal mold that has molded the molded component. If the recorded information is a cavity number, it is possible to trace about the molded component, retroacting to the moment of molding operations.

In the invention of Item (2-5) and Item (2-51), a resin circulation path can be manufactured easily, because a supporting shaft section is formed so that a shape of its section may be circular.

In the invention of Item (2-6) and Item (2-52), there can be formed a molded component that is stable when it is placed, because a section of the supporting shaft section is formed to be almost trapezoidal.

In the invention of Item (2-7) to (2-10) and Item (2-53), there can be formed a molded component that is stable when it is placed, because a section of the supporting shaft section is formed to be almost semicircular.

In the invention of Item (2-11) and Item (2-54), a metal mold can be designed easily, and positioning is easy.

In the invention of Item (2-12) to (2-14) and Item (2-55), holding and conveyance of a molded component are easy because the convex portion is formed on the supporting shaft section.

In the invention of Item (2-15) and Item (2-56), holding and conveyance of a molded component are easy because the concave portion is formed on the supporting shaft section.

In the invention of Item (2-16) and Item (2-57), cutting is easy because the stress-concentration portion is formed.

In the invention of Item (2-17), it is possible to conduct cutting easily by tilting the supporting shaft section from the optical axis.

In the invention of Item (2-18), it is possible to conduct cutting easily by tilting the supporting shaft section from the optical functional section without moving it in the optical axis.

In the invention of Item (2-19) to Item (2-23), information is recorded on the connecting section, therefore, various pieces of information can be held as an optical molded component even in the case of a small-sized optical functional section. If the recorded information is a metal mold number, it is possible to trace the relationship between the molded component and the metal mold that has molded the molded component. If the recorded information is a cavity number, it is possible to trace about the molded component, retroacting to the moment of molding operations.

In the inventions of Item (2-24)–Item (2-26), even a lens which is extremely small in size can be conveyed and positioned in the process easily, and it can further be incorporated easily in a pickup unit, when the lens is handled with a reference represented by a supporting shaft section provided solidly with the lens, which is an advantage.

In the invention of Item (2-27), a prescribed position serves as reference and it does not have an influence on the optical functional section, thereby, operations can be equalized.

In the invention of Item (2-28), positioning is conducted by using the supporting shaft section which is larger than the optical functional section, thereby, positioning can be conducted accurately.

In the invention of Item (2-29), the supporting shaft section which is larger than the optical functional section is held (gripped), thereby, holding is easy.

In the invention of Item (2-30), assembling is conducted by using the supporting shaft section which is larger than the optical functional section, thereby, mounting and assembling can be conducted surely.

In the invention of Item (2-31), cutting is conducted with reference of the supporting shaft section which is larger than the optical functional section, thereby, holding and gripping are sure, and erroneous cutting is prevented.

In the invention of Item (2-32) to Item (2-34), assembling is conducted by using the supporting shaft section which is larger than the optical functional section, and cutting is conducted with reference of the supporting shaft section which is larger than the optical functional section, thereby, the extremely small lens can be incorporated in the device easily.

In the invention of Item (2-39), recording of information is conducted through the method of stamping, and therefore, information can be given freely as occasion demands after molding, and information is not separated from the molded component because information is recorded integrally.

In the invention of Item (2-40), recording of information is conducted through the method of printing, and therefore, information can be given freely as occasion demands after molding, and information is not separated from the molded component because information is recorded integrally. If information is given through an ink jet system, in particular, an amount of information can be increased by classification by coloring.

In the invention of Item (2-41), recording of information is conducted through the method of label pasting, and therefore, information can be given freely as occasion demands after molding, and an amount of information can be increased by classification by coloring.

In the invention of Item (2-42), the positioning for the optical molded component can be done easily, therefore, it is very advantageous for the actual use of it.

In the invention of Item (2-43), the optical molded component can be surly guided in a production line in a factory, therefore, it is very advantageous for the actual use of it.

In the invention of Items (2-44), (2-58) and (2-59), a supporting shaft section, a connecting section and a molded component having an optical functional section can be formed easily.

In the invention of Item (2-45), handling after molding is easy because a three-dimensional distinguishing mark is formed simultaneously in the course of molding.

In the invention of Item (2-46), a resin flow is excellent because the direction of resin inflow is linear.

In the invention of Item (2-47), a resin flow is excellent because the direction of resin inflow is linear continuously.

In the invention of Item (2-48), a metal mold can be structured in three dimensions, because a resin inflow path is provided to cross at right angles.

In the invention of Item (2-49) and Item (2-50), it can be applied to a mold having a runner or a gate, therefore, it is very advantageous for the actual use of it.

In the invention of Item (2-60) and Item (2-64), assembling the optical molded component onto a unit can be done easily, therefore, the manufacturing cost, of course, can be reduced. Further, the accuracy in the assembling each component onto the entire unit can be enhanced.

What is claimed is:

1. An objective lens for use in an optical pickup apparatus for conducting recording and/or reproducing information for an optical information recording medium, comprising:

a lens section shaped in an approximate circle and including a flange section; and a first projecting section integrally provided to the lens section;

wherein the following conditional formulas are satisfied:

$$0.5 \leq A \leq 2.0$$

$$0.3 \leq A \leq 1.7A$$

where A is a diameter (mm) of the lens section when the lens section is viewed from an direction of an optical axis, and B is a width (mm) of the first projecting section when the first projecting section is viewed from the direction of the optical axis.

2. The objective lens of claim 1, wherein the first projecting section is extended from the lens section in a direction substantially perpendicular to the optical axis.

3. The objective lens of claim 2, wherein the following conditional formulas are satisfied:

$$0.3A \leq B \leq 0.8A.$$

4. The objective lens of claim 1, further comprising a second projecting section integrally provided to the lens section, wherein the first projecting section and the second projecting section are extended from the lens section in respective opposite directions each substantially perpendicular to the optical axis.

5. The objective lens of claim 4, wherein the size of the first projecting section is different from that of the second projecting section.

6. The objective lens of claim 5, wherein the thickness of the first projecting section in the direction of the optical axis is different from that of the second projecting section.

7. The objective lens of claim 4, wherein the length of the first projecting section in the direction perpendicular to the optical axis is different from that of the second projecting section.

8. The objective lens of claim 5, wherein the width of the first projecting section when the first projecting section is viewed from the optical axis is different from that of the second projecting section.

9. The objective lens of claim 1, wherein the first projecting section is shaped in a square and the lens section is positioned at the center of the square.

10. The objective lens of claim 1, wherein the lens section comprises an aspheric lens section.

11. The objective lens of claim 1, wherein the lens section comprises a diffractive structure.

12. The objective lens of claim 1, wherein the objective lens consists of a plastic.

13. The objective lens of claim 1, wherein the objective lens consists of a glass.

14. The objective lens of claim 1, wherein the objective lens is a molded resin lens.

15. The objective lens of claim 14, wherein the resin enters through a single gate in a mold so that the molded lens comprises a single first projecting section.

16. The objective lens of claim 15, wherein the first projecting section is used as a resin flowing passage in a mold.

17. The objective lens of claim 14, wherein the resin enters through plural gates in a mold so that the molded lens comprises plural projecting sections.

18. The objective lens of claim 14, wherein the resin enters through two opposite gates in a mold so that the molded lens comprises two opposing projecting sections.

19. The objective lens of claim 14, wherein the molded lens comprises a square first projecting section and the resin enters through one end of the square first projecting section.

20. The objective lens of claim 14, wherein the molded lens comprises a welded portion at a position other than an optical functional section.

21. The objective lens of claim 14, wherein the molded lens is produced by a method of injection molding.

22. The objective lens of claim 14, wherein the molded lens is produced by a method of compression molding.

23. An optical pickup apparatus, comprising:
    the objective lens of claim 1.

24. The objective lens of claim 1, wherein the diameter A of the lens section is 1 mm to 1.5 mm.

25. The objective lens of claim 1, wherein the width B of the first projecting section is 0.5 mm to 1.0 mm.

* * * * *

UNITED STATES PATENT AND TRADEMARK OFFICE
CERTIFICATE OF CORRECTION

PATENT NO.    : 6,765,732 B2
DATED         : July 20, 2004
INVENTOR(S)   : Shogo Yamamoto et al.

It is certified that error appears in the above-identified patent and that said Letters Patent is hereby corrected as shown below:

Title page,
Item [57], ABSTRACT,
Line 10, "an direction" should read -- a direction --.

Column 23,
Line 36, "$0.3 \leqq A \leqq 1.7A$" should read -- $0.3A \leqq B \leqq 1.7A$ --.
Line 39, "an direction" should read -- a direction --.

Signed and Sealed this

Twenty-seventh Day of September, 2005

JON W. DUDAS
*Director of the United States Patent and Trademark Office*